(12) United States Patent
Festa

(10) Patent No.: US 8,332,811 B2
(45) Date of Patent: Dec. 11, 2012

(54) SYSTEMS AND METHODS FOR GENERATING SOURCE CODE FOR WORKFLOW PLATFORM

(75) Inventor: John M. Festa, Metuchen, NJ (US)

(73) Assignee: United Parcel Service of America, Inc.

( * ) Notice: Subject to any disclaimer, the term of this patent is extended or adjusted under 35 U.S.C. 154(b) by 872 days.

(21) Appl. No.: 12/433,533

(22) Filed: Apr. 30, 2009

(65) Prior Publication Data

US 2010/0281462 A1    Nov. 4, 2010

(51) Int. Cl.
G06F 9/44 (2006.01)
G06F 13/00 (2006.01)
(52) U.S. Cl. .................. 717/106; 717/109; 709/217
(58) Field of Classification Search ............ 717/108
See application file for complete search history.

(56) References Cited

U.S. PATENT DOCUMENTS

| | | | |
|---|---|---|---|
| 4,627,101 A | 12/1986 | Anderson et al. | |
| 5,257,363 A | 10/1993 | Shapiro et al. | |
| 5,543,851 A | 8/1996 | Chang | |
| 5,615,301 A | 3/1997 | Rivers | |
| 5,677,739 A | 10/1997 | Kirkland | |
| 5,737,725 A | 4/1998 | Case | |
| 5,894,320 A | 4/1999 | Vancelette | |
| 5,900,908 A | 5/1999 | Kirkland | |
| 6,397,192 B1 | 5/2002 | Notani et al. | |
| 6,430,357 B1 | 8/2002 | Orr | |
| 6,643,652 B2 * | 11/2003 | Helgeson et al. | 707/104 |
| 6,721,747 B2 * | 4/2004 | Lipkin | 709/209 |
| 6,850,893 B2 * | 2/2005 | Lipkin et al. | 705/7.11 |
| 6,993,743 B2 | 1/2006 | Crupi et al. | |
| 7,019,787 B2 | 3/2006 | Park | |
| 7,047,518 B2 | 5/2006 | Little et al. | |
| 7,050,109 B2 | 5/2006 | Safadi et al. | |
| 7,065,493 B1 | 6/2006 | Homsi | |
| 7,072,934 B2 * | 7/2006 | Helgeson et al. | 709/203 |
| 7,089,583 B2 * | 8/2006 | Mehra et al. | 726/3 |
| 7,126,606 B2 | 10/2006 | Beda et al. | |
| 7,130,790 B1 | 10/2006 | Flanagan et al. | |
| 7,184,967 B1 | 2/2007 | Mital et al. | |
| 7,219,340 B2 | 5/2007 | Schechter et al. | |

(Continued)

OTHER PUBLICATIONS

"SQL-DMO API—SQL Server 2000," MSDN, copyright 2012, downloaded from http://msdn.microsoft.com/en-us/library/aa174487(V=sql.80).aspx.

(Continued)

*Primary Examiner* — Don Wong
*Assistant Examiner* — Mohammad Kabir
(74) *Attorney, Agent, or Firm* — Alston & Bird LLP

(57) ABSTRACT

Various embodiments of the present invention provide systems and methods for enabling design, generation, and execution of real-time workflows. Such embodiments provide a graphical designer including a plurality of shapes representing the various objects of a workflow that are used to model the workflow. In addition, various embodiments of the graphical designer provide shapes to model aspects of the workflow not found in previous graphical designers. Various embodiments also provide a code generator that converts the representation of the workflow into executable code for multiple target languages. Various embodiments also provide a workflow engine based on a Petri net model responsible for executing the workflow and for delegating tasks to be performed for the workflow to an operating system. In various embodiments, the workflow engine further includes a platform abstraction layer that provides a transition layer from the Petri net language to the operating system language.

30 Claims, 31 Drawing Sheets

OVERVIEW OF PROCESS FOR ENABLING DESIGN, GENERATION, AND EXECUTION OF A REAL-TIME WORKFLOW

U.S. PATENT DOCUMENTS

| | | | |
|---|---|---|---|
| 7,221,405 | B2 | 5/2007 | Basson et al. |
| 7,272,820 | B2 | 9/2007 | Kilanev |
| 7,337,438 | B1 | 2/2008 | Dobbins et al. |
| 7,451,432 | B2 * | 11/2008 | Shukla et al. ............... 717/106 |
| 7,502,072 | B2 | 3/2009 | Onomatsu et al. |
| 7,624,349 | B2 * | 11/2009 | Seemann et al. ............. 715/762 |
| 7,693,897 | B2 * | 4/2010 | Bugir et al. ................. 707/707 |
| 7,694,272 | B2 * | 4/2010 | Bronicki et al. ............. 717/109 |
| 8,065,219 | B2 * | 11/2011 | Haynie et al. ................. 705/37 |
| 2002/0100029 | A1 | 7/2002 | Bowen |
| 2002/0111965 | A1 | 8/2002 | Kutter |
| 2003/0055811 | A1 | 3/2003 | Stork et al. |
| 2005/0044197 | A1 | 2/2005 | Lai |
| 2005/0256818 | A1 | 11/2005 | Sun et al. |
| 2005/0278152 | A1 | 12/2005 | Blaszczak |
| 2006/0074730 | A1 | 4/2006 | Shukla et al. |
| 2006/0074731 | A1 | 4/2006 | Green et al. |
| 2006/0074732 | A1 | 4/2006 | Shukla et al. |
| 2006/0074734 | A1 | 4/2006 | Shukla et al. |
| 2006/0074737 | A1 | 4/2006 | Shukla et al. |
| 2006/0136490 | A1 | 6/2006 | Aggarwal et al. |
| 2006/0242002 | A1 | 10/2006 | Sun et al. |
| 2006/0253397 | A1 | 11/2006 | Gomez et al. |
| 2007/0094211 | A1 | 4/2007 | Sun et al. |
| 2007/0143736 | A1 | 6/2007 | Moriarty et al. |
| 2009/0172013 | A1 | 7/2009 | Gupta et al. |

OTHER PUBLICATIONS

Declaration of Asheesh Goja dated Aug. 10, 2009.

Office Action dated Jan. 25, 2012, for U.S. Appl. No. 12/433,563, filed Apr. 30, 2009.

Salimifard, et al. "Petri Net-based Modelling of Workflow Systems: An Overview" (2001) European Journal of Operation Research 134 (2001) 664-676.

Meena, H. K., Saha, I., Mondal, K. K. and Prabhakar, T. V. "An Approach to Workflow Modeling and Analysis", Proc. 2005 OOPSLA Workshop Eclipse Technol. eXchange, p. 85.

van der Aalst, W.M.P., "Making Work Flow: On the Application of Petri nets to Business Process Management", in: J. Esparza, C. Lakos (Eds.), Application and Theory of Petri Nets 2002, Lecture Notes in Computer Science, vol. 2360, Springer, Berlin, 2002, pp. 1-22.

van der Aalst, W.M.P., Lassen, K.B.: Translating Workflow Nets to BPEL, Eindhoven University of Technology, Eindhoven. BETA Working Paper Series (2005).

Office Action for U.S. Appl. No. 12/433,563, mailed Oct. 6, 2011.

* cited by examiner

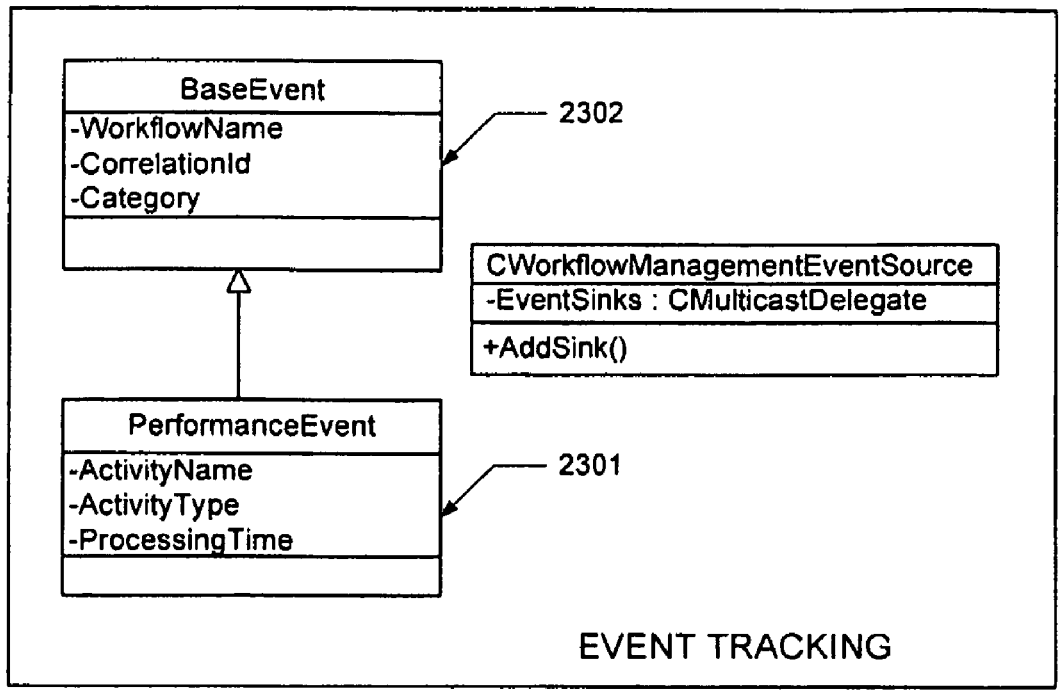
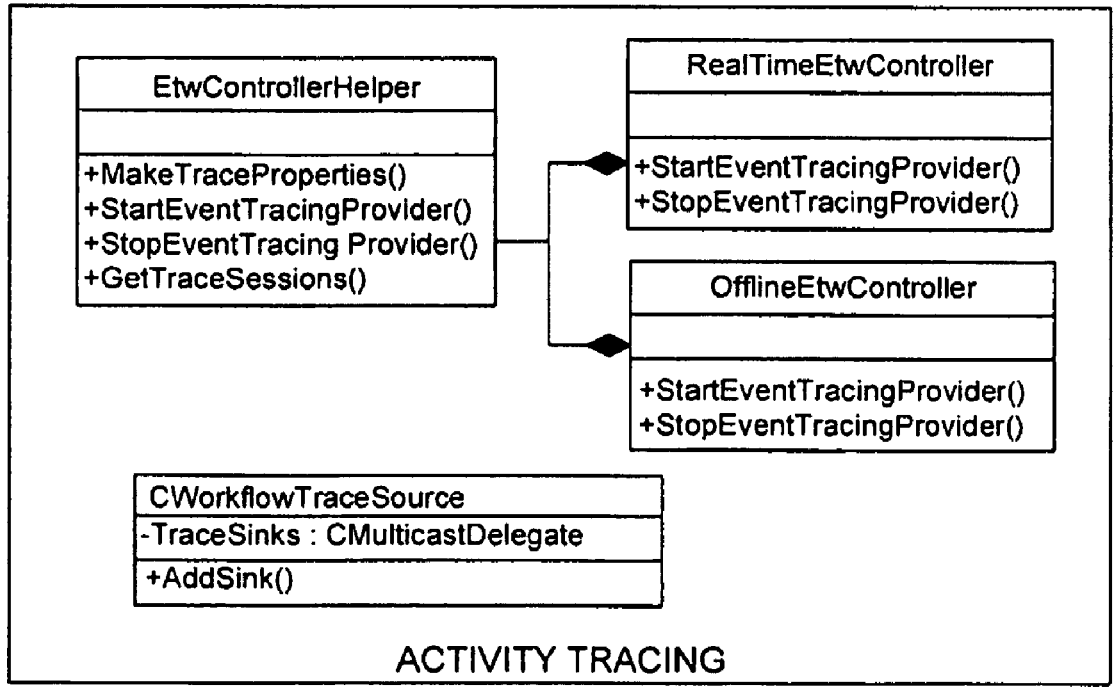
FIG. 23

```xml
<?xml version="1.0" encoding="utf-8" ?>
<WorkflowPage xmlns:xsi="http://www.w3.org/2001/XMLSchema-instance" xmlns:xsd="http://www.w3.org/2001/XMLSchema">
  <WorkflowDesignerConfiguration>
  <FlowChartModel name="SampleFlowChart" contract="SampleFlowChart.xsd">    ← 2603
    <Guards>
      <BinaryGuard name="WF_BOOL">
        <Condition name="NO" value="0" />
        <Condition name="YES" value="1" />
      </BinaryGuard>
    </Guards>
    <Elements>        ← 2601
      <StartTransition name="Start" />
      <DecisionTransition name="Decision" guard="WF_BOOL" />
      <ProcessTransition name="Process" />
      <GatewayTransition name="Database Query" contract="..\..\..\..\temp\MyGateway\MyGatewayDataContract.xsd" />   ← 2604
      <WorkflowTransition name="Nested Workflow" nestedPage="ProcessData.workflow" />
      <ProcessTransition name="Task A" />
      <ProcessTransition name="Task B" />
      <ConditionalFork name="C Fork" />
      <ConditionalMerge name="C Merge" />
      <EndTransition name="End" />
    </Elements>
    <Connectors>        ← 2602
      <ActivityConnector start="Start" end="Decision" />
      <GuardedActivityConnector start="Decision" end="Process" condition="NO" />
      <GuardedActivityConnector start="Decision" end="Database Query" condition="YES" />
      <ActivityConnector start="Database Query" end="Nested Workflow" />
      <ActivityConnector start="Process" end="Nested Workflow" />
      <ActivityConnector start="Nested Workflow" end="C Fork" />
      <ActivityConnector start="C Merge" end="End" />
      <ActivityConnector start="C Fork" end="Task A" />
      <ActivityConnector start="C Fork" end="Task B" />
      <ActivityConnector start="Task B" end="C Merge" />
      <ActivityConnector start="Task A" end="C Merge" />
    </Connectors>
  </FlowChartModel>
  <PageConfiguration>
    <CodeGeneration Language="CPlusPlus" Platform="VisualStudio" />
    <ProjectHint>
    <GatewayHint contractFileName="MyGatewayDataContract.xsd">
  </PageConfiguration>
</WorkflowPage>
```

```cpp
//SampleFlowChart.cpp
#include "stdafx.h"

#include "SampleFlowChartDependencies.h"

#include "SampleFlowChartTransitions.h"
using SampleFlowChartImplementation::Transitions::StartTransition;
using SampleFlowChartImplementation::Transitions::EndTransition;
using SampleFlowChartImplementation::Transitions::DecisionTransition;
using SampleFlowChartImplementation::Transitions::ProcessTransition;
using SampleFlowChartImplementation::Transitions::DatabaseQueryTransition;
using SampleFlowChartImplementation::Transitions::ExtractInformationTransition;
using SampleFlowChartImplementation::Transitions::TaskBTransition;
using SampleFlowChartImplementation::Transitions::TaskATransition;

#include "SampleFlowChart.h"

namespace SampleFlowChartImplementation
{
    void SampleFlowChartDirector::AssembleWorkflow()      ← 2701
    {
        std::wstring flowChartName = L"SampleFlowChart";
        std::wstring flowChartInstanceGuid;
        PetriNet::Infrastructure::GuidHelper::GenerateGuidString( flowChartInstanceGuid );
        _builder.BuildWorkflow(_pWorkflow, flowChartName, flowChartInstanceGuid);

_builder.BuildStartProcess<StartTransition>(_pWorkflow, L"Start");
        _builder.BuildEndProcess<EndTransition>(_pWorkflow, L"End");
        _builder.BuildDecision<DecisionTransition,WF_BOOL>(_pWorkflow, L"Decision");
        _builder.BuildProcess<ProcessTransition>(_pWorkflow, L"Process");

_builder.BuildGatewayTransition<HostedTestGatewayOperationalContractFactoryRemote,HostedTestGatewayRequest,HostedTestGatewayResponse,DatabaseQueryTransition>(_pWorkflow, L"Database Query");
        _builder.BuildSubWorkflowTransition<ProcessDataDirector,ExtractInformationTransition>(_pWorkflow,L"ExtractInformation");
        _builder.BuildConditionalFork(_pWorkflow,L"C Fork");
        _builder.BuildConditionalMerge(_pWorkflow,L"C Merge");
        _builder.BuildProcess<TaskBTransition>(_pWorkflow, L"Task B");
        _builder.BuildProcess<TaskATransition>(_pWorkflow, L"Task A");

_builder.ConnectDecisionToProcess(_pWorkflow, L"Decision",L"Process",WF_BOOL::NO);
        _builder.ConnectDecisionToGateway(_pWorkflow, L"Decision",L"Database Query",WF_BOOL::YES);
        _builder.ConnectProcessToProcess(_pWorkflow, L"Start",L"Decision");
        _builder.ConnectProcessToSubWorkflow(_pWorkflow, L"Process",L"ExtractInformation");
        _builder.ConnectGatewayToSubWorkflow(_pWorkflow, L"Database Query",L"ExtractInformation");
        _builder.ConnectSubWorkflowToConditionalFork(_pWorkflow, L"ExtractInformation",L"C Fork");
        _builder.ConnectConditionalForkToProcess(_pWorkflow, L"C Fork",L"Task B");
        _builder.ConnectConditionalForkToProcess(_pWorkflow, L"C Fork",L"Task A");
        _builder.ConnectProcessToConditionalMerge(_pWorkflow, L"Task A",L"C Merge");
        _builder.ConnectProcessToConditionalMerge(_pWorkflow, L"Task B",L"C Merge");
        _builder.ConnectConditionalMergeToProcess(_pWorkflow, L"C Merge",L"End");
```

```
//SampleFlowChartTransitions.h
pragma once namespace SampleFlowChartImplementation
{
    namespace Transitions
    {
        class TransitionNotImplementedException
        {
        };

class StartTransition
        {
        public:
            void Execute( SampleFlowChartCaseData & caseData, SampleFlowChartWorkingSet & workingSet);
        private:
            void OnExecute( SampleFlowChartCaseData & caseData, SampleFlowChartWorkingSet & workingSet);
        };

class EndTransition
        {
        public:
            void Execute( SampleFlowChartCaseData & caseData, SampleFlowChartWorkingSet & workingSet);
        private:
            void OnExecute( SampleFlowChartCaseData & caseData, SampleFlowChartWorkingSet & workingSet);
        };

class DecisionTransition                                    ◄── 2801
        {
        public:
            WF_BOOL EvaluateCondition(const SampleFlowChartCaseData & caseData, const SampleFlowChartWorkingSet & workingSet);
            WF_BOOL OnEvaluateCondition(const SampleFlowChartCaseData & caseData, const SampleFlowChartWorkingSet & workingSet);
                                                          ◄── 2803                                                           ◄── 2804
        };
                ◄── 2802
        class ProcessTransition
        {
        public:
            void Execute( SampleFlowChartCaseData & caseData, SampleFlowChartWorkingSet & workingSet);
            void OnExecute( SampleFlowChartCaseData & caseData, SampleFlowChartWorkingSet & workingSet);
                                                                                                                    ◄── 2805
        };
```

FIG. 28

```
#include "stdafx.h"

#include "SampleFlowChartDependencies.h"
#include "SampleFlowChartTransitions.h"

//<rte_declaration uid="72657355-5220-6765-696f-6e0000000000">
//Place user-defined declarations (e.g. #includes) in this region
//</rte_declaration> namespace SampleFlowChartImplementation
{
    namespace Transitions
    {

//<rte_implementation uid="ba7eeffc-9a19-4a66-957f-37cf0dd8484e">
void StartTransition::OnExecute( SampleFlowChartCaseData & caseData,  SampleFlowChartWorkingSet & workingSet)
{
    //application specific code
}
//</rte_implementation>

//<rte_implementation uid="a12c7d13-b029-48ec-b93f-15abaa6d4f77">
void EndTransition::OnExecute( SampleFlowChartCaseData & caseData,  SampleFlowChartWorkingSet & workingSet)
{
    //application specific code
}
//</rte_implementation>

//<rte_implementation uid="02b8eaf3-3f4d-4e3b-929d-bb1ca42ad84e">
WF_BOOL DecisionTransition::OnEvaluateCondition(const SampleFlowChartCaseData & caseData, const SampleFlowChartWorkingSet & workingSet)
{
    throw TransitionNotImplementedException();
}
//</rte_implementation>

//<rte_implementation uid="e59d237d-08b0-476c-8d50-8559d3bae7bd">
void ProcessTransition::OnExecute( SampleFlowChartCaseData & caseData,  SampleFlowChartWorkingSet & workingSet)
{
    //application specific code
}
//</rte_implementation>
```

```
//Workflow Director
namespace SampleFlowChartImplementation
{
    [WorkflowIdentifier("69c54ae6-cd29-4699-a2f4-58229ab394f2")]
    public class SampleFlowChartDirector
        : Director<SampleFlowChartCaseData, SampleFlowChartWorkingSet, FlowChartBuilder<SampleFlowChartCaseData,
SampleFlowChartWorkingSet>>
    {
        protected override void AssembleWorkflow()
        {
            String workflowName = "SampleFlowChart" ;
            _builder.BuildWorkflow( workflowName, WorkflowUuid);

_builder.BuildStartProcess< StartTransition >("Start");
            _builder.BuildEndProcess< EndTransition >("End");
            _builder.BuildDecision< DecisionTransition, WF_BOOL >("Decision");
            _builder.BuildProcess< ProcessTransition >("Process");
            _builder.BuildGatewayTransition< HostedTestGatewayOperationalContractFactoryRemote, HostedTestGatewayRequest,
HostedTestGatewayResponse, DatabaseQueryTransition>("Database Query");
            _builder.BuildSubWorkflowTransition< ProcessDataDirector, ProcessDataCaseData, ProcessDataWorkingSet,
ExtractInformationTransition >("ExtractInformation");
            _builder.BuildConditionalFork("C Fork");
            _builder.BuildConditionalMerge("C Merge");
            _builder.BuildProcess< TaskBTransition >( "Task B");
            _builder.BuildProcess< TaskATransition >( "Task A");

_builder.ConnectDecisionToProcess( "Decision", "Process", WF_BOOL.NO);
            _builder.ConnectDecisionToGateway( "Decision", "Database Query", WF_BOOL.YES);
            _builder.ConnectProcessToProcess( "Start", "Decision");
            _builder.ConnectProcessToSubWorkflow( "Process", "ExtractInformation");
            _builder.ConnectGatewayToSubWorkflow( "Database Query", "ExtractInformation");
            _builder.ConnectSubWorkflowToConditionalFork( "ExtractInformation", "C Fork");
            _builder.ConnectConditionalForkToProcess( "C Fork", "Task B");
            _builder.ConnectConditionalForkToProcess( "C Fork", "Task A");
            _builder.ConnectProcessToConditionalMerge( "Task A", "C Merge");
            _builder.ConnectProcessToConditionalMerge( "Task B", "C Merge");
            _builder.ConnectConditionalMergeToProcess( "C Merge", "End");
```

FIG. 30

```
namespace SampleFlowChartImplementation
{
    namespace Transitions
    {
        internal class TransitionNotImplementedException
            : System.ApplicationException
        {
        } internal partial class StartTransition
            : ITransitionActivity< SampleFlowChartCaseData , SampleFlowChartWorkingSet >
        {
            public override void Execute(SampleFlowChartCaseData caseData, SampleFlowChartWorkingSet workingSet)
            {
                OnExecute(caseData,workingSet);
            }
        } internal partial class EndTransition
            : ITransitionActivity< SampleFlowChartCaseData , SampleFlowChartWorkingSet >
        {
            public override void Execute(SampleFlowChartCaseData caseData, SampleFlowChartWorkingSet workingSet)
            {
                OnExecute(caseData,workingSet);
            }
        } internal partial class DecisionTransition
            : IDecisionActivity< SampleFlowChartCaseData , SampleFlowChartWorkingSet, WF_BOOL >
        {
            public override WF_BOOL EvaluateCondition(SampleFlowChartCaseData caseData, SampleFlowChartWorkingSet workingSet)
            {
                return OnEvaluateCondition(caseData,workingSet);
            }
        } internal partial class ProcessTransition
            : ITransitionActivity< SampleFlowChartCaseData , SampleFlowChartWorkingSet >
        {
            public override void Execute(SampleFlowChartCaseData caseData, SampleFlowChartWorkingSet workingSet)
            {
                OnExecute(caseData,workingSet);
            }
        }
    }
}
```

FIG. 31

```
namespace SampleFlowChartImplementation
{
    namespace Transitions
    {
        internal partial class StartTransition
                                            : ITransitionActivity< SampleFlowChartCaseData , SampleFlowChartWorkingSet >
        {
            //<rte_region uid="ba7eeffc-9a19-4a66-957f-37cf0dd8484e">
            private void OnExecute(SampleFlowChartCaseData caseData, SampleFlowChartWorkingSet workingSet)
            {
                //application specific code
            }
            //</rte_region>
        } internal partial class EndTransition
                                            : ITransitionActivity< SampleFlowChartCaseData , SampleFlowChartWorkingSet >
        {
            //<rte_region uid="a12c7d13-b029-48ec-b93f-15abaa6d4f77">
            private void OnExecute(SampleFlowChartCaseData caseData, SampleFlowChartWorkingSet workingSet)
            {
                //application specific code
            }
            //</rte_region>
        } internal partial class DecisionTransition
                                            : IDecisionActivity< SampleFlowChartCaseData , SampleFlowChartWorkingSet , WF_BOOL >
        {
            //<rte_region uid="02b8eaf3-3f4d-4e3b-929d-bb1ca42ad84e">
            private WF_BOOL OnEvaluateCondition(SampleFlowChartCaseData caseData, SampleFlowChartWorkingSet workingSet)
            {
                //application specific code
            }
            //</rte_region>
        }
```

FIG. 32 ary systems. Such processes involve real-time computing with hardware and software systems that are subject to real-time constraints. In many cases, overall orchestration or choreography of the workflow must happen very fast, sometimes in the order of a few hundred milliseconds.

SYSTEMS AND METHODS FOR GENERATING SOURCE CODE FOR WORKFLOW PLATFORM

BACKGROUND OF THE INVENTION

A workflow is the flow or progression of work that describes the tasks, procedural steps, organizations or people involved in a particular business process. In addition, a workflow may indicate the required input and output information, and tools needed for each step in the business process.

A number of organizations institute workflow automation products that allow the organization to create a workflow model and components such as online forms and then to use this product as a way to manage and enforce the consistent handling of work. For example, a manufacturing company may use a workflow automation application to ensure that a purchase order received for merchandise is handled consistently from the initial receiving of the order to the final shipment of the merchandise to the customer. Thus, the workflow ensures each person and system involved in the process of fulfilling purchase orders successfully completes their step before allowing the process to proceed to the next procedural step in the process.

In various industries, operations have numerous business processes that have high-throughput and short running requirements. These may be known as real-time systems. Such processes involve real-time computing with hardware and software systems that are subject to real-time constraints. In many cases, overall orchestration or choreography of the workflow must happen very fast, sometimes in the order of a few hundred milliseconds.

Various real-time systems are known to be "hard," that is completion of an operation after its deadline is considered useless. Ultimately, this may lead to a critical failure of the complete system. Other real-time systems are known to be "soft" and will tolerate lateness of an operation, though the lateness may lead to decreased service quality.

For example, a real-time system may be designed to produce a label for a package running on a conveyor belt. The package has a bar code and runs on the conveyor belt and is scanned by an operator using a handheld device. The information is processed by the real-time computer system and the system goes through and connects to multiple external systems to obtain the information needed to produce a package label.

Different external systems make decisions based on the scanned information. For instance, a system will determine whether the address indicated in the scanned information is correct or not and another system will look at the dimensions indicated in the scanned information and will evaluate whether they are different than the actual dimensions of the package to determine whether the package needs to be re-billed. All of this information processing must be performed within 200 to 300 milliseconds. This is because the package label must be produced and printed out at the end of the conveyor belt so that the operator can retrieve the label from a printer, apply the label to the package, and place the package in the correct bin at the end of the conveyor belt.

Many commercial workflow products (e.g., workflow engines on the market) are not designed for such business processes. This is because many of these products involve a great deal of overhead such as a database engine, a message server, and/or a WebLogic® server. As a result, these workflow engines cannot scale down to very short time frames. Thus, a need exists for a workflow product that allows a designer to design high performance, short duration workflows and that can execute such workflows.

BRIEF SUMMARY OF VARIOUS EMBODIMENTS OF THE INVENTION

A system for executing a workflow according to various embodiments includes memory adapted to store a workflow engine module and a processor in communication with the memory and adapted to execute the workflow engine module. In various embodiments, the workflow represents a progression of physical work to perform.

In particular embodiments, the workflow engine module includes a Petri net domain model. The Petri net domain model includes a set of objects wherein each object represents a particular type of element of a Petri net model. In various embodiments, the Petri net model is a single token, non-color Petri net.

In addition, in various embodiments, the workflow engine module is adapted to read source code representing a particular workflow that indicates elements of the particular workflow and connectors between elements of the particular workflow to sequence the elements of the particular workflow. In particular embodiments, the workflow engine module is further adapted to load the particular workflow into memory by mapping each element of the particular workflow and each connector of the particular workflow to one or more objects of the set of objects of the Petri net domain model based on rules governing the Petri net model. Furthermore, the workflow engine module according to various embodiments is adapted to execute the particular workflow loaded into memory.

The set of objects of the Petri net domain model in various embodiments includes a token object, a place object, an arc object, and a transition object. In addition, in various embodiments, the set of objects further includes one or more trigger objects to represent triggering a transition object based on stimuli external to the workflow engine. Furthermore, in various embodiments, the set of objects further includes one or more guard objects to represent conditional logic placed on objects representing connectors of the particular workflow.

In various embodiments, the workflow engine module also includes one or more abstraction layer components adapted for delegating tasks associated with one or more elements of the particular workflow to an operating system to be performed by the operating system. These abstraction layer components of various embodiments include one or more delegate components comprising pointers to source code for the tasks. In addition, the runtime components of various embodiments are further adapted to pass the delegate components to the operating system so that the operating system can used the pointers to access the source code to execute to perform the tasks.

A computer-implemented process to generate a workflow engine according to further embodiments includes a Petri net domain model that includes a set of objects, wherein each object represents a particular type of element of a Petri net model. The process, according to various embodiments, further includes reading source code representing a particular workflow that indicates elements of the particular workflow and connectors between elements of the particular workflow to sequence the elements of the particular workflow. In addition, the process, according to various embodiments, includes loading the particular workflow into memory by mapping each element of the particular workflow to one or more objects of the set of objects and mapping each connector of the particular workflow to one or more objects of the set of objects based on rules governing the Petri net model. Furthermore, the process, according to various embodiments, includes executing the particular workflow loaded into memory.

A computer-readable medium containing code executable by a processor to generate a workflow engine according to further embodiments includes a Petri net domain model that includes a set of objects, wherein each object represents a particular type of element of a Petri net model. The computer-readable medium of various embodiments further includes one or more runtime components adapted for reading source code representing a particular workflow that indicates elements of the particular workflow and connectors between elements of the particular workflow to sequence the elements of the particular workflow.

Furthermore, in various embodiments, the runtime components are further adapted for loading the particular workflow into memory by mapping each element of the particular workflow to one or more objects of the set of objects and mapping each connector of the particular workflow to one or more objects of the set of objects based on rules governing the Petri net model. In addition, the runtime components in various embodiments are further adapted for executing the particular workflow loaded into memory.

Further embodiments also include a system for executing a workflow containing concurrency within the workflow that includes memory adapted to store a graphical designer module. In various embodiments, the system also includes a processor in communication with the memory and adapted to execute the graphical designer module.

The graphical designer module is adapted to generate a graphical representation of the workflow containing concurrency. In particular embodiments, the graphical designer includes a desktop workspace and a plurality of shapes adapted to be selectively dragged and dropped onto the workspace by a designer. Each shape expresses performance of at least one predefined role in the workflow, and one or more of the shapes express a role of concurrency within the workflow. In addition, in various embodiments, the graphical designer module is further adapted to generate executable code based on the graphical representation of the workflow containing concurrency.

In particular embodiments, the system further includes a workflow engine module adapted to execute the code generated by the graphical designer module. For instance, the workflow engine module executes the code to perform the workflow and to manage the concurrency of the workflow. In various embodiments, the workflow engine module is further adapted to manage the concurrency of the particular workflow by managing threads. For instance, in various embodiments, the workflow engine module manages the threads by performing one or more of managing an internal thread pool, spinning off a thread, managing thread creation, and managing thread synchronization.

Furthermore, a computer-implemented process for executing a workflow containing concurrency within the workflow according to further embodiments includes the steps of: (1) generating a graphical representation of the workflow containing concurrency by dragging and dropping a plurality of shapes onto a desktop workspace, wherein each shape expresses performance of at least one predefined role in the workflow and one or more of the shapes express a role of concurrency within the workflow; (2) generating executable code based on the graphical representation of the workflow containing concurrency; and (3) executing the code using a workflow engine to perform the workflow and to manage the concurrency of the workflow.

In various embodiments, the step of executing the code using the workflow engine to manage the concurrency of the particular workflow is performed by managing threads. In addition, in various embodiments, the step of executing the code using the workflow engine to manage the concurrency of the particular workflow is performed by executing code to manage one or more of an internal thread pool, spinning off a thread, thread creation, and thread synchronization. Furthermore, in various embodiments, the step of generating executable code does not entail generating code to manage the threads.

A computer-readable medium containing code executable by a processor to generate a graphical designer according to further embodiments includes a desktop workspace and a plurality of shapes adapted to be selectively dragged and dropped onto the workspace by a designer. In various embodiments, each shape expresses performance of at least one predefined role in a workflow process, wherein one or more of the shapes are adapted to express a role of concurrency within the workflow process.

In addition, in various embodiments, a workflow engine is adapted to execute code generated to represent a particular workflow designed using the graphical designer and having at least one shape expressing the role of concurrency. The workflow engine of these particular embodiments is also adapted to manage the concurrency of the particular workflow.

In particular embodiments, the one or more shapes expressing the role of concurrency include a parallel fork and a parallel merge. These shapes are adapted to represent two or more processes of the workflow performing concurrently, wherein all of the processes complete before the workflow continues. In addition, in various embodiments, the one or more shapes expressing the role of concurrency include a conditional fork and a conditional merge. These shapes are adapted to represent two or more processes of the workflow performing concurrently, wherein the workflow continues when any one of the processes completes.

Further embodiments include a system for executing a workflow communicating with a resource external to the workflow. The system includes a memory adapted to store a graphical designer module and a processor in communication with the memory and adapted to execute the graphical designer module.

According to various embodiments, the graphical designer module is adapted to generate a graphical representation of the workflow communicating with the resource external to the workflow. The graphical designer module includes a desktop workspace and a plurality of shapes adapted to be selectively dragged and dropped onto the workspace by a designer. In various embodiments, each shape expresses performance of at least one predefined role in the workflow, wherein one or more of the shapes express a role of communicating with the resource external to the workflow. In addition, in various embodiments, the graphical designer module is further adapted to generate executable code based on the graphical representation of the workflow.

Furthermore, the system of various embodiments may also include a workflow engine module adapted to execute the code generated by the graphical designer module to perform the workflow and to manage communication with the resource external to the workflow. In various embodiments, the graphical designer is adapted to generate code to indicate communicating with the resource external to the workflow; however the graphical designer is not adapted to generate code to perform communicating with the resource external to the workflow.

Further embodiments include a computer-readable medium containing code executable by a processor to generate a graphical designer. The computer-readable medium of these embodiments includes a desktop workspace and a plurality of shapes adapted to be selectively dragged and dropped onto the workspace by a designer. In various embodiments, each shape expresses performance of at least one predefined role in a workflow process, wherein one or more of the shapes express a role of communicating with a resource external to the workflow process. This is so that a workflow engine adapted for executing code generated to represent a particular workflow designed using the graphical workflow designer and having at least one shape expressing the role of communicating with the external resource is further adapted to manage communicating with the process external to the particular workflow. In various embodiments, the shapes expressing the role of communicating with the resource external to the workflow process comprise one or more gateways.

A computer-implemented process for executing a workflow communicating with a resource external to the workflow according to further embodiments includes the steps of: (1) generating a graphical representation of the workflow communicating with the resource external to the workflow by dragging and dropping a plurality of shapes onto a workspace, wherein each shape expresses performance of at least one predefined role in the workflow and one or more shapes express a role of communicating with the resource external to the workflow; (2) generating executable code based on the graphical representation of the workflow; and (3) executing the code using a workflow engine to perform the workflow and to manage communication with the resource external to the workflow. In various embodiments, the step of generating executable code does not entail generating code to perform communicating with the resource external to the workflow.

A system for generating source code for a workflow in a particular target language according to further embodiments includes memory adapted to store a code generator and a processor in communication with the memory and adapted to execute the code generator. In various embodiments, the target language includes one of C++, C#, .Net, or Java programming language.

In various embodiments, the code generator is adapted to read a file including a workflow domain model for a workflow including a first set of objects. Each object of the first set of objects represents a particular workflow activity of the workflow or a particular connection between two activities of the workflow. In addition, in various embodiments, each object carries properties associated with the particular workflow activity or the particular connection.

Furthermore, the code generator of various embodiments is adapted to create a target language domain model that includes a second set of objects. Each object of the second set of objects represents an appropriate object of the target language for each object of the workflow domain model. In various embodiments, the code generator is further adapted to transcribe the properties associated with each object of the workflow domain model to the corresponding object of the target language domain model, and generate the source code for the workflow in the particular target language from the target language domain model.

In various embodiments, the workflow domain model does not carry with it any information about what source code is going to be generated. In various embodiments, the source code indicates each activity of the workflow and the connections between the activities. In addition, the source code includes a set of one or more methods. Each method is associated with a particular workflow activity and each method serves as a skeleton for a developer to write the content to perform for the specific workflow activity. In various embodiments, these methods are callback methods.

Further embodiments include a computer-readable medium containing code executable to generate source code for a workflow in a particular target language. The computer-readable medium includes one or more runtime components adapted for reading a file including a workflow domain model for a workflow including a first set of objects. Each object of the first set of objects represents a particular workflow activity of the workflow or a particular connection between two activities of the workflow. In addition, in various embodiments, each object carries properties associated with the particular workflow activity or the particular connection.

Furthermore, the runtime components of various embodiments are further adapted for creating a target language domain model including a second set of objects. Each object of the second set of objects represents an appropriate object of the target language for each object of the workflow domain model. In various embodiments, the runtime components are further adapted for transcribing the properties associated with each object of the workflow domain model to the corresponding object of the target language domain model and for generating source code for the workflow in the particular target language from the target language domain model. In addition, in various embodiments, the workflow domain model does not carry with it any information about what source code is going to be generated.

A computer-implemented process for generating source code for a workflow in a particular target language according to further embodiments includes the step of reading a file including a workflow domain model for a workflow that includes a first set of objects. Each object of the first set of objects represents a particular workflow activity of the workflow or a particular connection between two activities of the workflow. In addition, in various embodiments, each object carries properties associated with the particular workflow activity or the particular connection.

The process, according to various embodiments, further includes the step of creating a target language domain model comprising a second set of objects. Each object of the second set of objects represents an appropriate object of the target language for each object of the workflow domain model. In various embodiments, the process further includes the steps of transcribing the properties associated with each object of the workflow domain model to the corresponding object of the target language domain model and generating the source code for the workflow in the particular target language from the target language domain model. In various embodiments, the workflow domain model does not carry with it any information about what the source code is going to be generated.

Further embodiments include a system for generating one or more source code files that include memory adapted to store a code generator and a processor in communication with the memory and adapted to execute the code generator. The code generator is adapted to operate on a domain model that includes a hierarchy of classes in a source code language. In various embodiments, the hierarchy of classes includes an element class that includes a method for writing a declaration and a method for writing an implementation and serving as the root of the hierarchy of classes. In addition, in various embodiments, the hierarchy of classes includes one or more artifact classes that represent the artifacts of the source code language. Each artifact class is represented as a derivation of the element class and includes an implementation of the method for writing the declaration that makes semantic sense for the particular artifact and an implementation of the method for writing the implementation that makes semantic sense for the particular artifact.

Furthermore, the hierarchy of claims according to various embodiments includes one or more source code file classes representing source code files. In various embodiments, each source code file class includes an implementation of the method for writing the declaration, an implementation of the method for writing the implementation, and a write method which orchestrates writing the contents to the one or more source code files.

The code generator of particular embodiments is further adapted to generate a file of the one or more source code files by composing one or more networks of the classes from the domain model, adding each composition of the networks to either the implementation of the method for writing the declaration or the implementation of the method for writing the implementation of the appropriate source file class, and invoking the write method on the appropriate source code file class to generate a source code file. In various embodiments, these generated source code files may include header files and/or implementation files.

In addition, in particular embodiments, the domain model also includes one or more networks of classes, wherein a network includes more than one class and one or more of the classes of the network serve as constituents of one or more of the other classes of the network. In various embodiments, invoking the write method on the appropriate source file class implements the behavior of the implementation of the method for writing the declaration and the implementation of the method for writing the implementation of a particular class of the network by delegating to the constituents of the particular class.

In various embodiments, the source code language is C++. In addition, in various embodiments, the element class is an abstract class. Furthermore, in various embodiments, the method for writing the declaration and the method for writing the implementation are abstract methods.

A computer-readable medium containing code executable by a processor to generate one or more source code files according to further embodiments includes one or more runtime components adapted for including a hierarchy of classes in a source code language. In various embodiments, the hierarchy of classes includes an element class that includes a method for writing a declaration and a method for writing an implementation and that serves as the root of the hierarchy of classes. In addition, in various embodiments, the hierarchy of classes includes one or more artifact classes representing the artifacts of the source code language. In various embodiments, each artifact class is represented as a derivation of the element class and includes an implementation of the method for writing the declaration that makes semantic sense for the particular artifact and an implementation of the method for writing the implementation that makes semantic sense for the particular artifact.

Furthermore, in various embodiments, the hierarchy of classes includes one or more source code file classes representing source code files. Each source code file class includes an implementation of the method for writing the declaration, an implementation of the method for writing the implementation, and a write method which orchestrates writing the contents to the one or more source code files.

In various embodiment, the runtime components are further adapted for composing one or more networks of the classes from the domain model, adding each composition of the networks to either the implementation of the method for writing the declaration or the implementation of the method for writing the implementation of the appropriate source file class, and invoking the write method on the appropriate source code file class to generate a source code file. In various embodiments, a network of the one or more networks includes more than one class and one or more of the classes of the network serve as constituents of one or more of the other classes of the network. Furthermore, in various embodiments, invoking the write method implements the behavior of the implementation of the method for writing the declaration and the implementation of the method for writing the implementation of a particular class of the network by delegating to the constituents of the particular class.

Further embodiments include a computer-implemented process for generating one or mores source code files that include the step of operating on a domain model. In various embodiments, the domain model includes a hierarchy of classes in a source code language. The hierarchy of classes according to various embodiments includes an element class that includes a method for writing a declaration and a method for writing an implementation and serves as the root of the hierarchy of classes. In addition, in various embodiments, the hierarchy of classes includes one or more artifact classes that represent the artifacts of the language. In various embodiments, each artifact class is represented as a derivation of the element class and includes an implementation of the method for writing the declaration that makes semantic sense for the particular artifact, and an implementation of the method for writing the implementation that makes semantic sense for the particular artifact.

The hierarchy of classes according to various embodiments may also include one or more source code file classes representing source code files. In various embodiments, each source file class includes an implementation of the method for writing the declaration, an implementation of the method for writing the implementation, and a write method which orchestrates writing the contents to the one or more source code files. In addition, in various embodiments, the domain module includes one or more networks, wherein a network of the one or more networks comprises more than one class and one or more of the classes of the network serve as constituents of one or more of the other classes of the network.

Furthermore, the process according to various embodiments further includes the steps of composing the one or more networks of the classes from the domain model, adding each composition of the networks to either the implementation of the method for writing the declaration or the implementation of the method for writing the implementation of the appropriate source code file class, and invoking the write method on the appropriate source code file class to generate a source code file. In various embodiments, the step of invoking the write method implements the behavior of the implementation of the method for writing the declaration and the implementation of the method for writing the implementation of a particular class of the network by delegating to the constituents of the particular class.

BRIEF DESCRIPTION OF THE DRAWINGS

Figure 1:
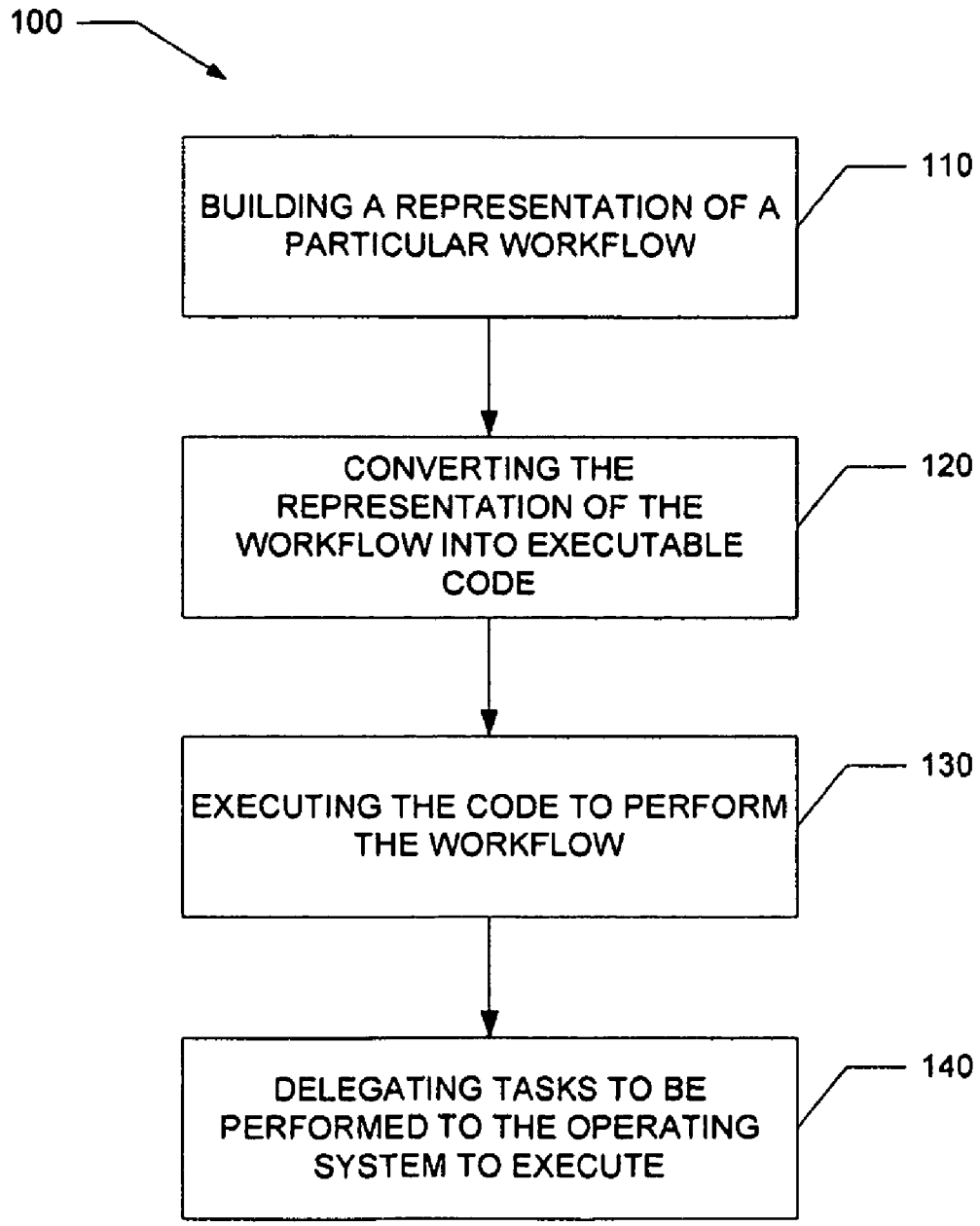

Having thus described the invention in general terms, reference will now be made to the accompanying drawings, which are not necessarily drawn to scale, and wherein:

FIG. 1 is a diagram illustrating an overview of a process for enabling design, generation, and execution of a real-time workflow according to various embodiments of the invention.

Figure 2:
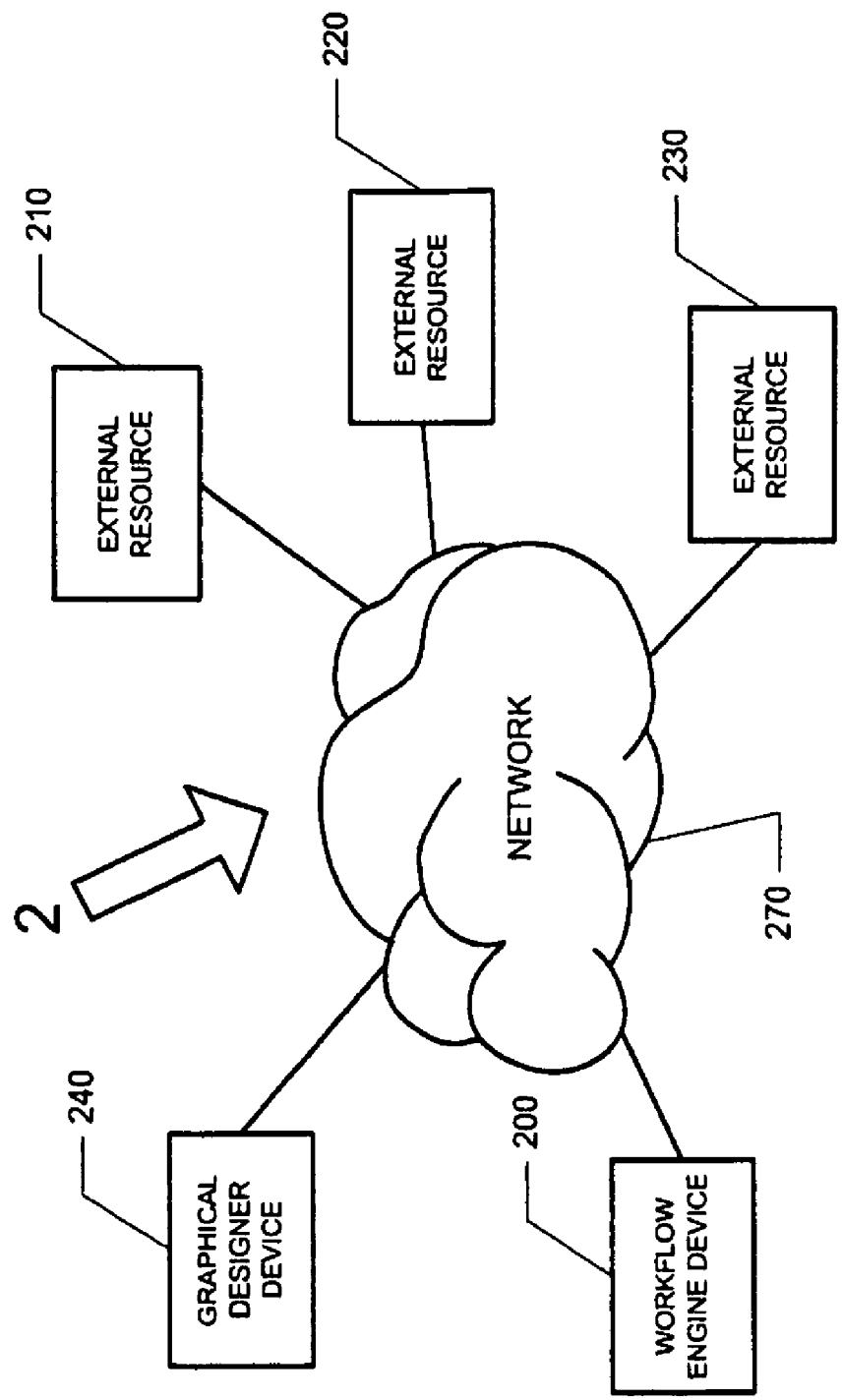

FIG. 2 is a schematic diagram illustrating a system including a workflow engine device according to various embodiments of the invention.

Figure 3:
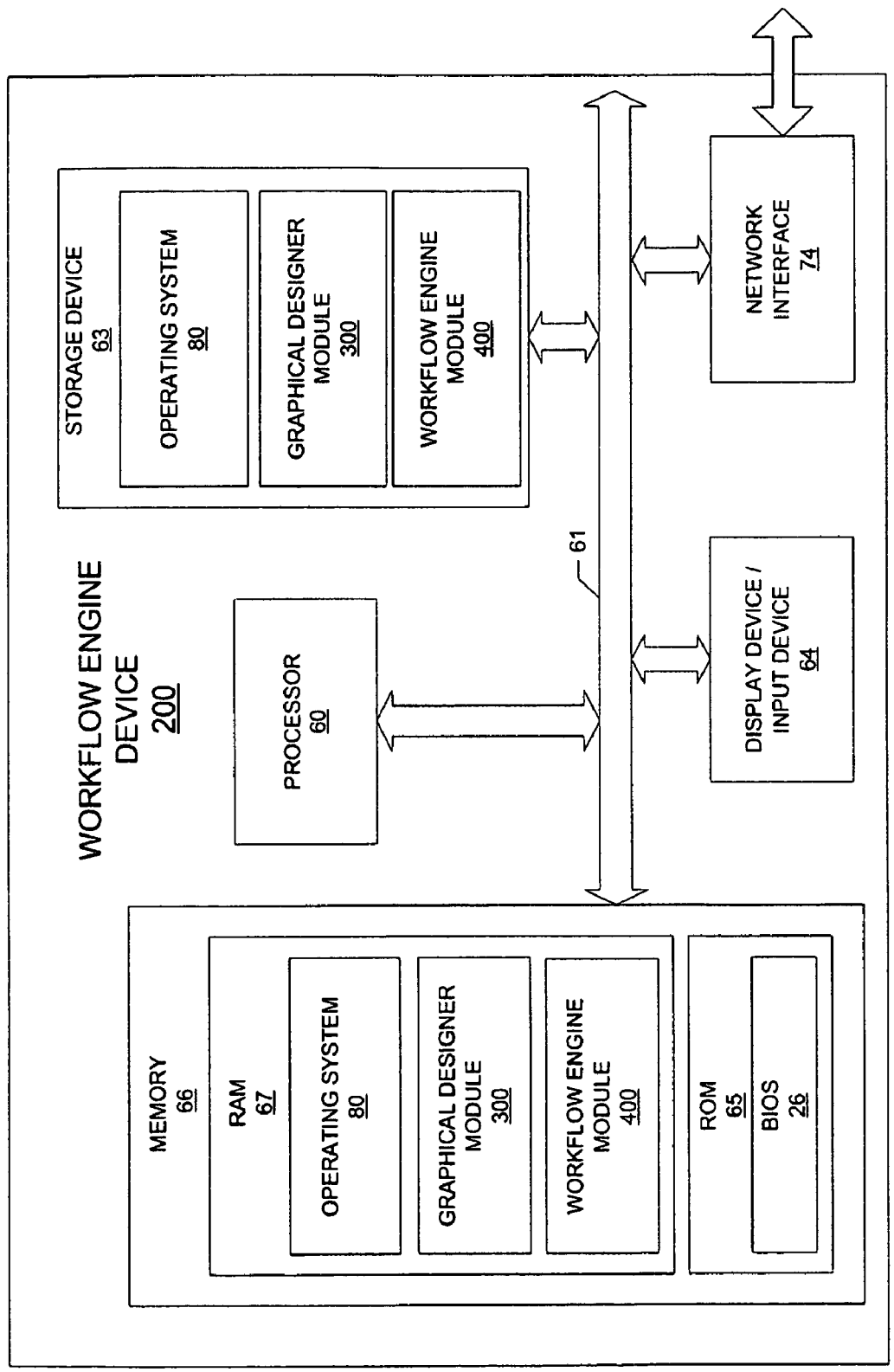

FIG. 3 is a schematic diagram illustrating a workflow engine device according to various embodiments of the invention.

Figure 4:
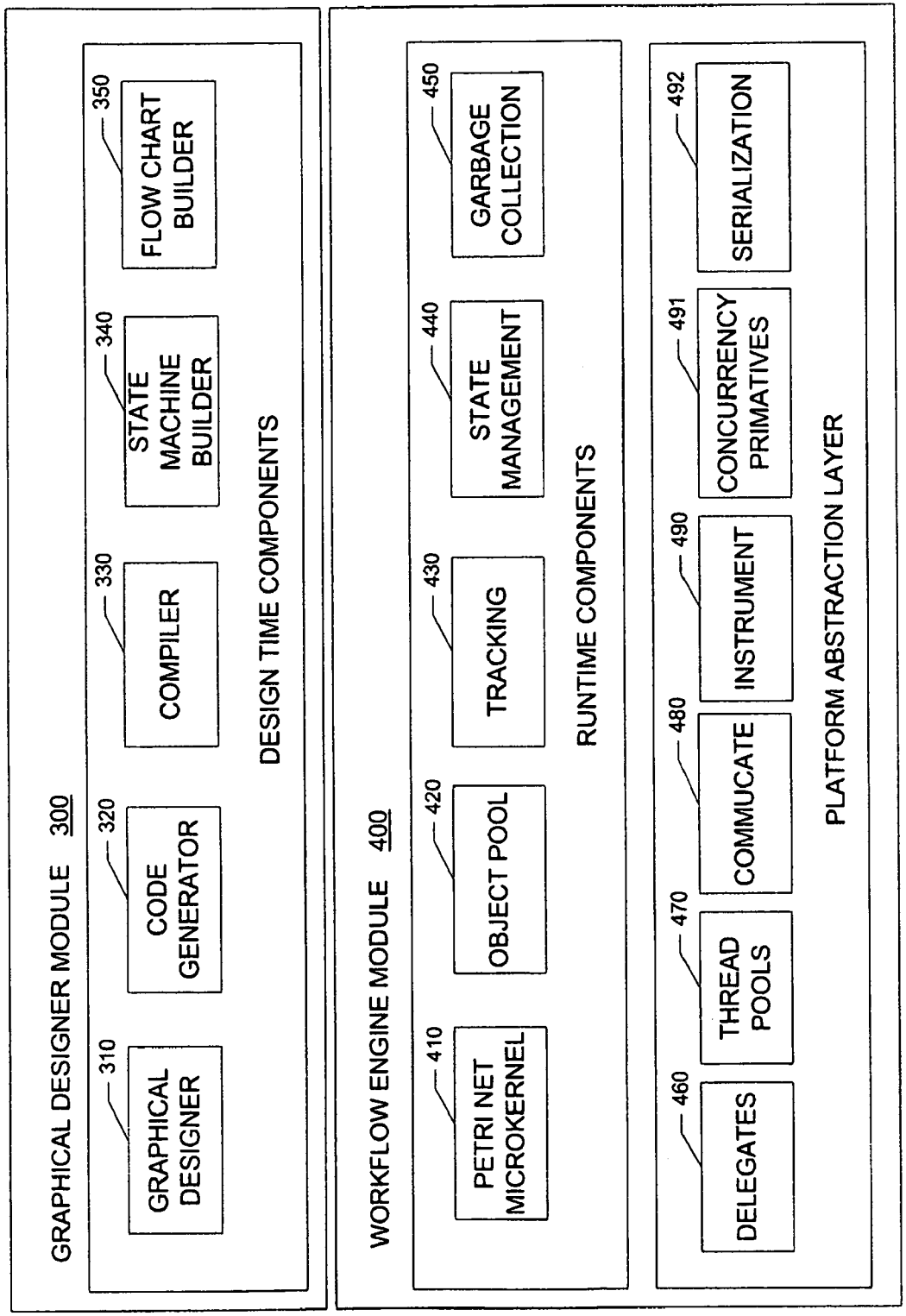

FIG. 4 is a diagram illustrating the architecture of a workflow engine device according to various embodiments of the invention.

Figure 5:
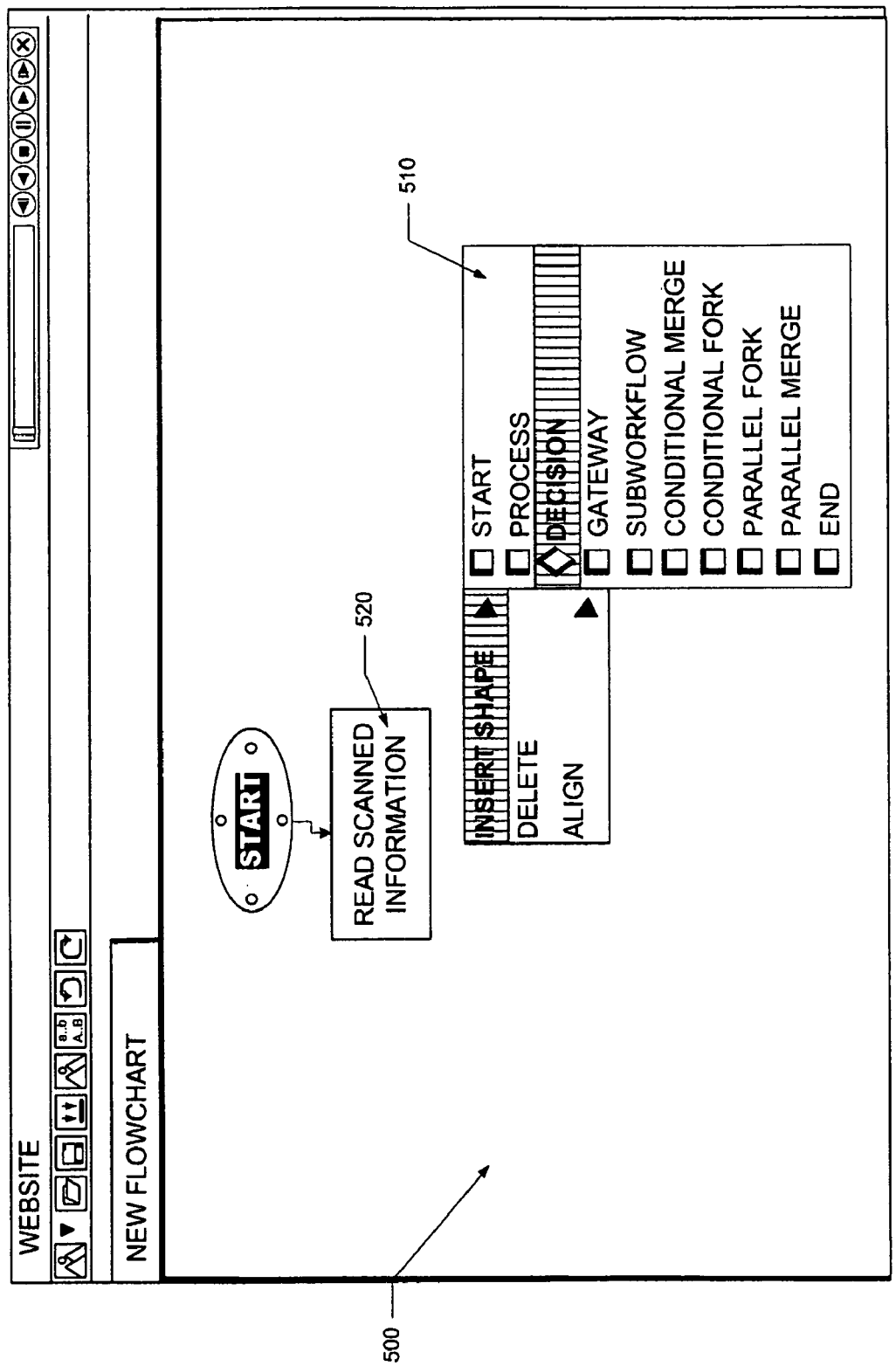

FIG. 5 is an illustration of a desktop workspace according to various embodiments of the invention.

Figure 6:
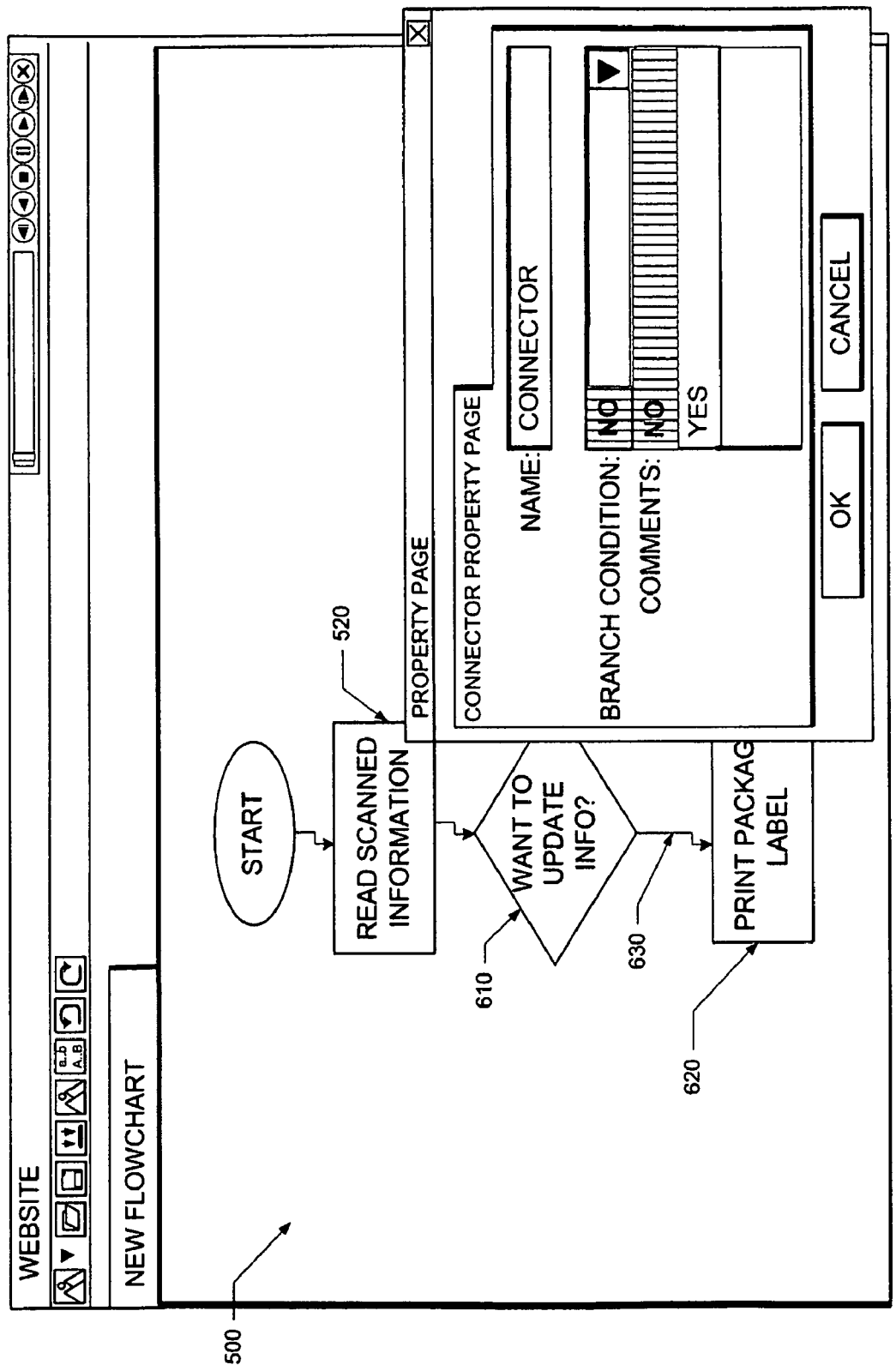

FIG. 6 is an additional illustration of the desktop workspace shown in FIG. 5 according to various embodiments of the invention.

Figure 7:
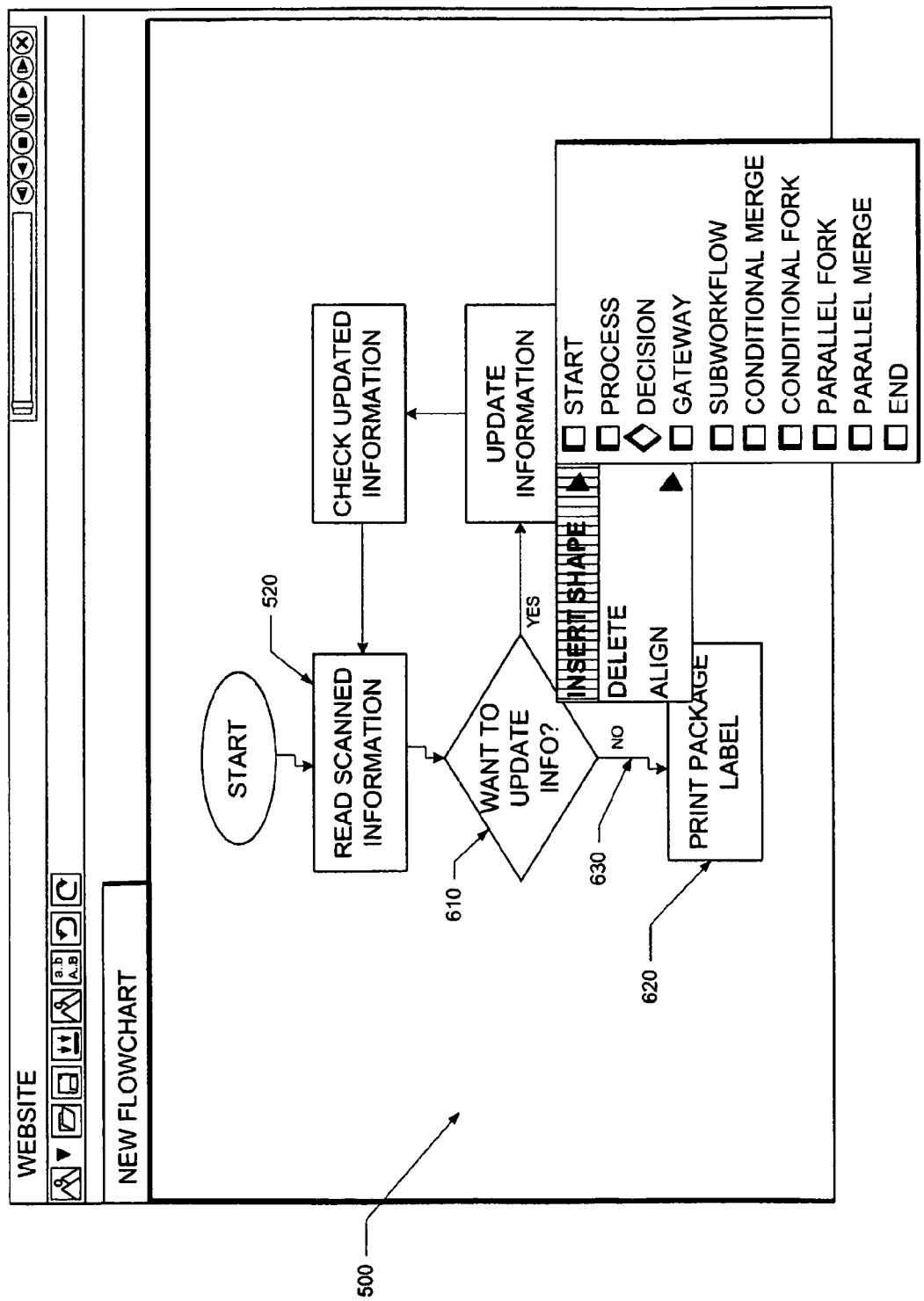

FIG. 7 is an additional illustration of the desktop workspace shown in FIG. 5 according to various embodiments of the invention.

Figure 8:
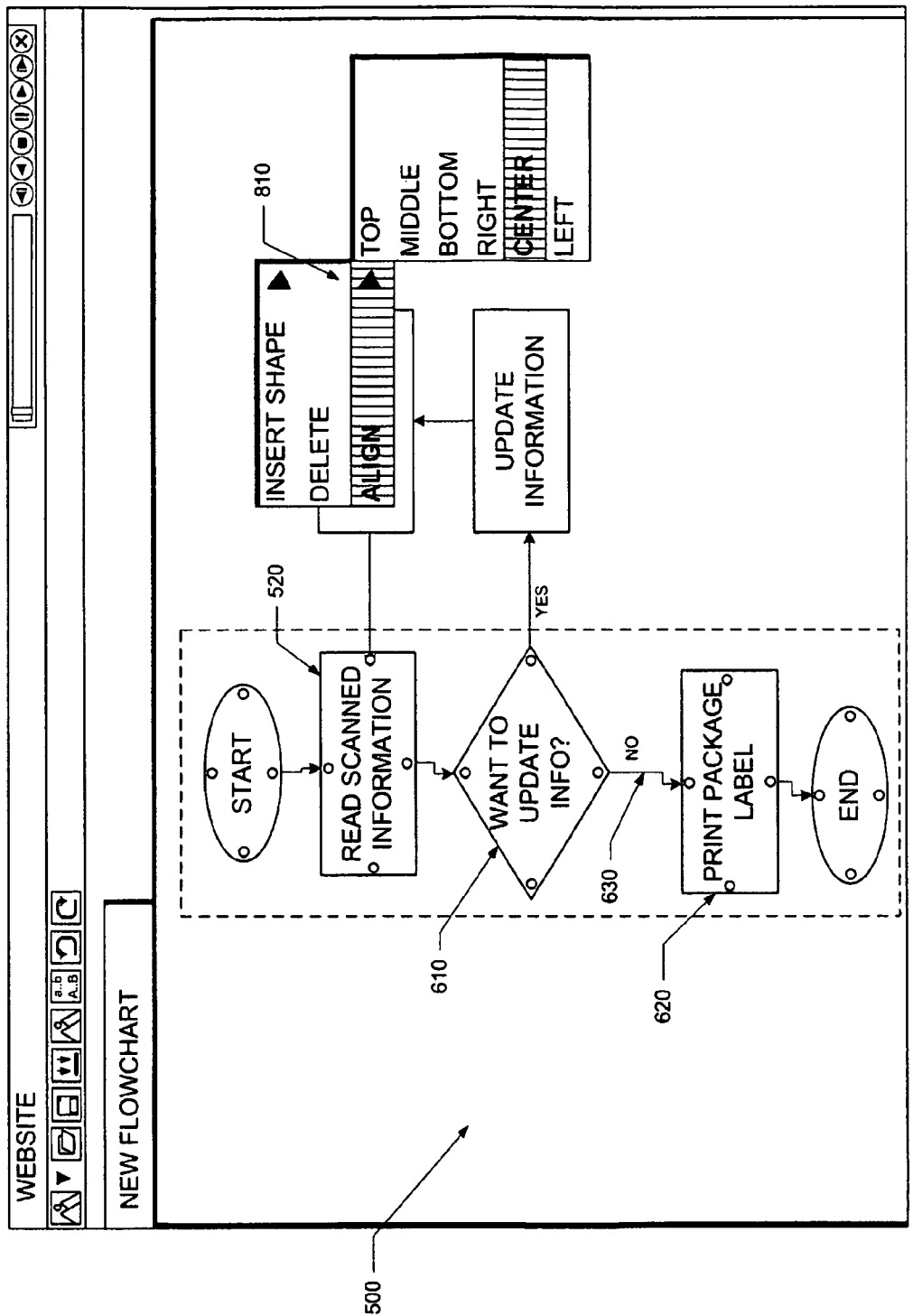

FIG. 8 is an additional illustration of the desktop workspace shown in FIG. 5 according to various embodiments of the invention.

Figure 9:
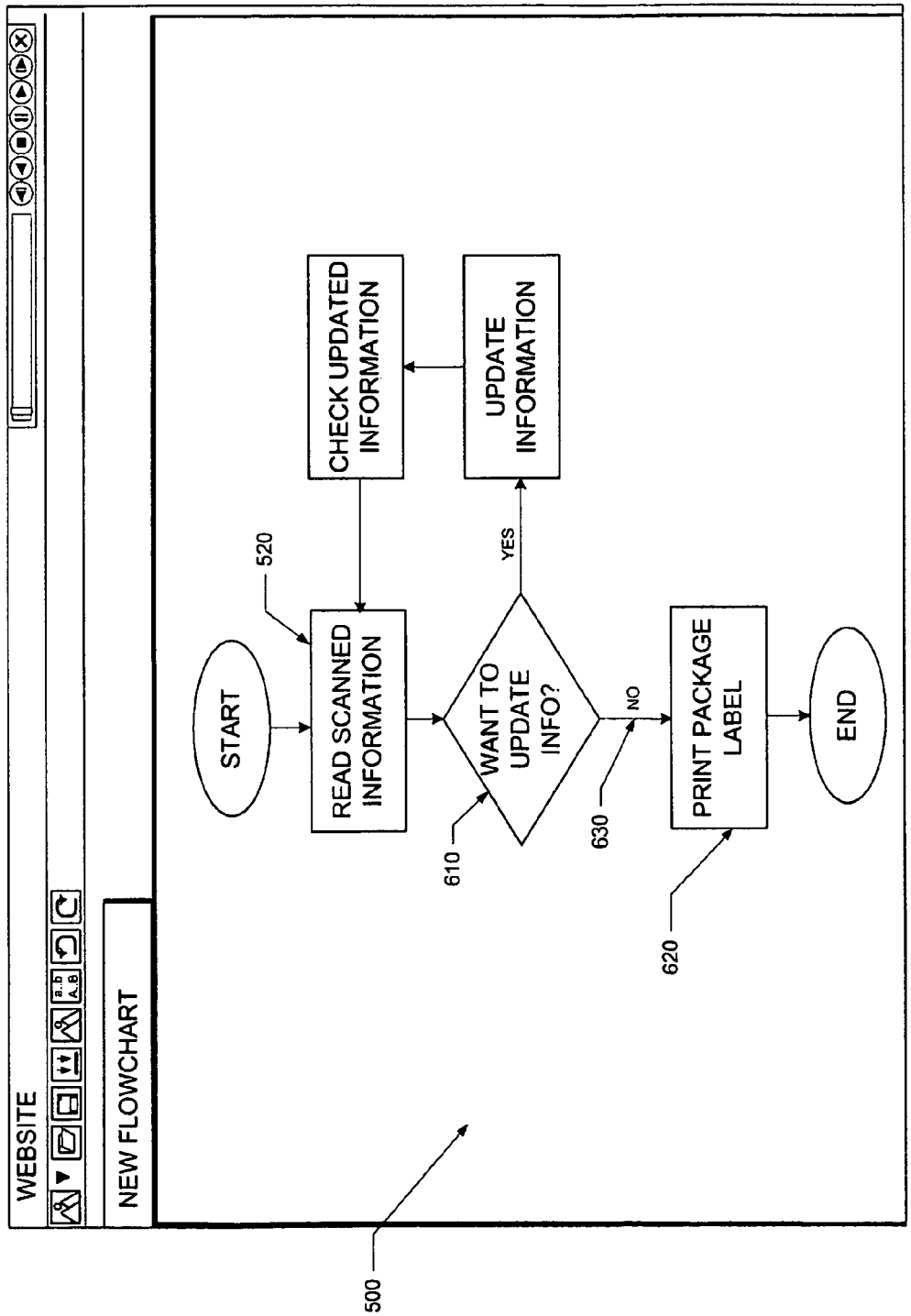

FIG. 9 is an additional illustration of the desktop workspace shown in FIG. 5 according to various embodiments of the invention.

Figure 10:
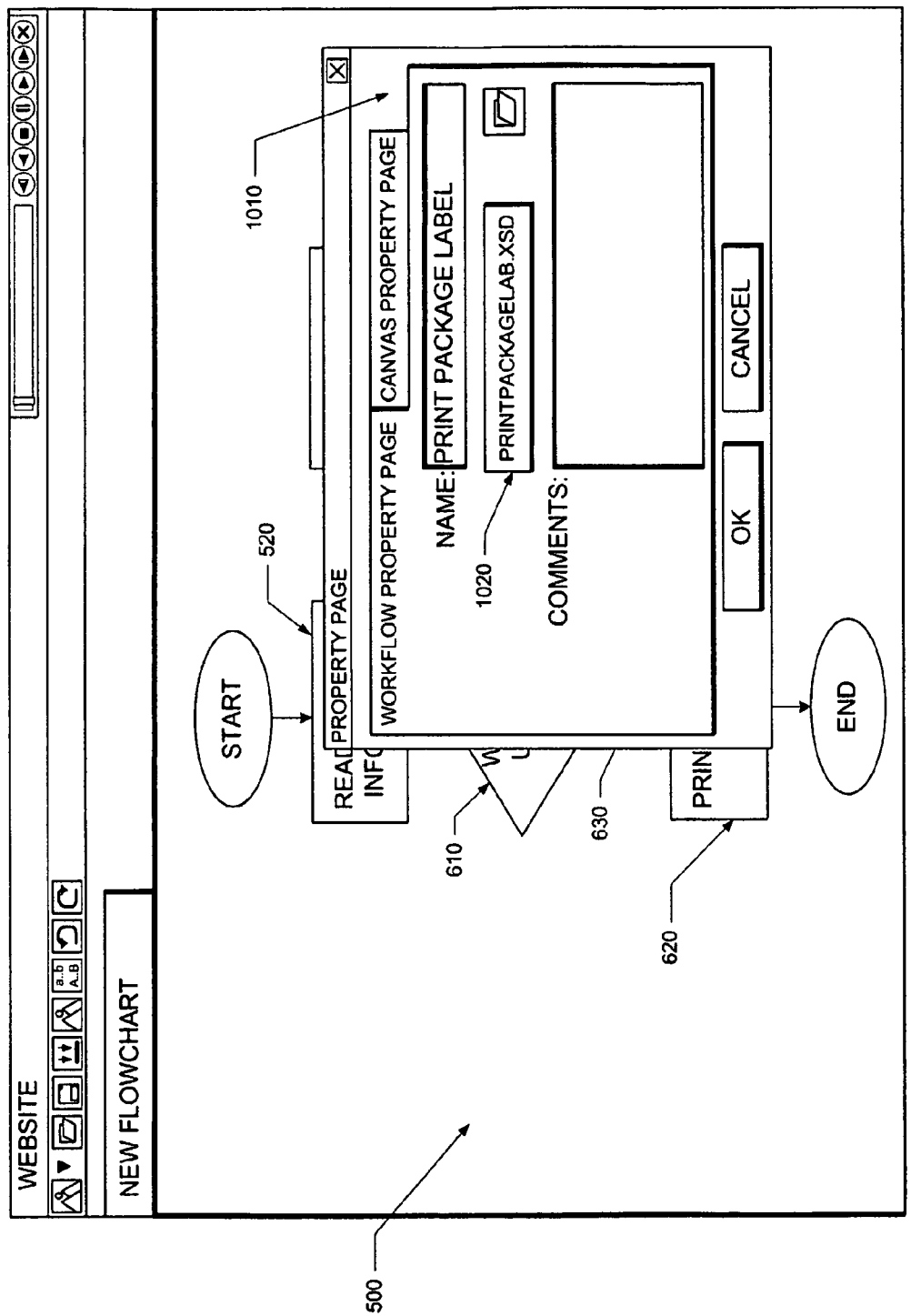

FIG. 10 is an additional illustration of the desktop workspace shown in FIG. 5 according to various embodiments of the invention.

Figure 11:
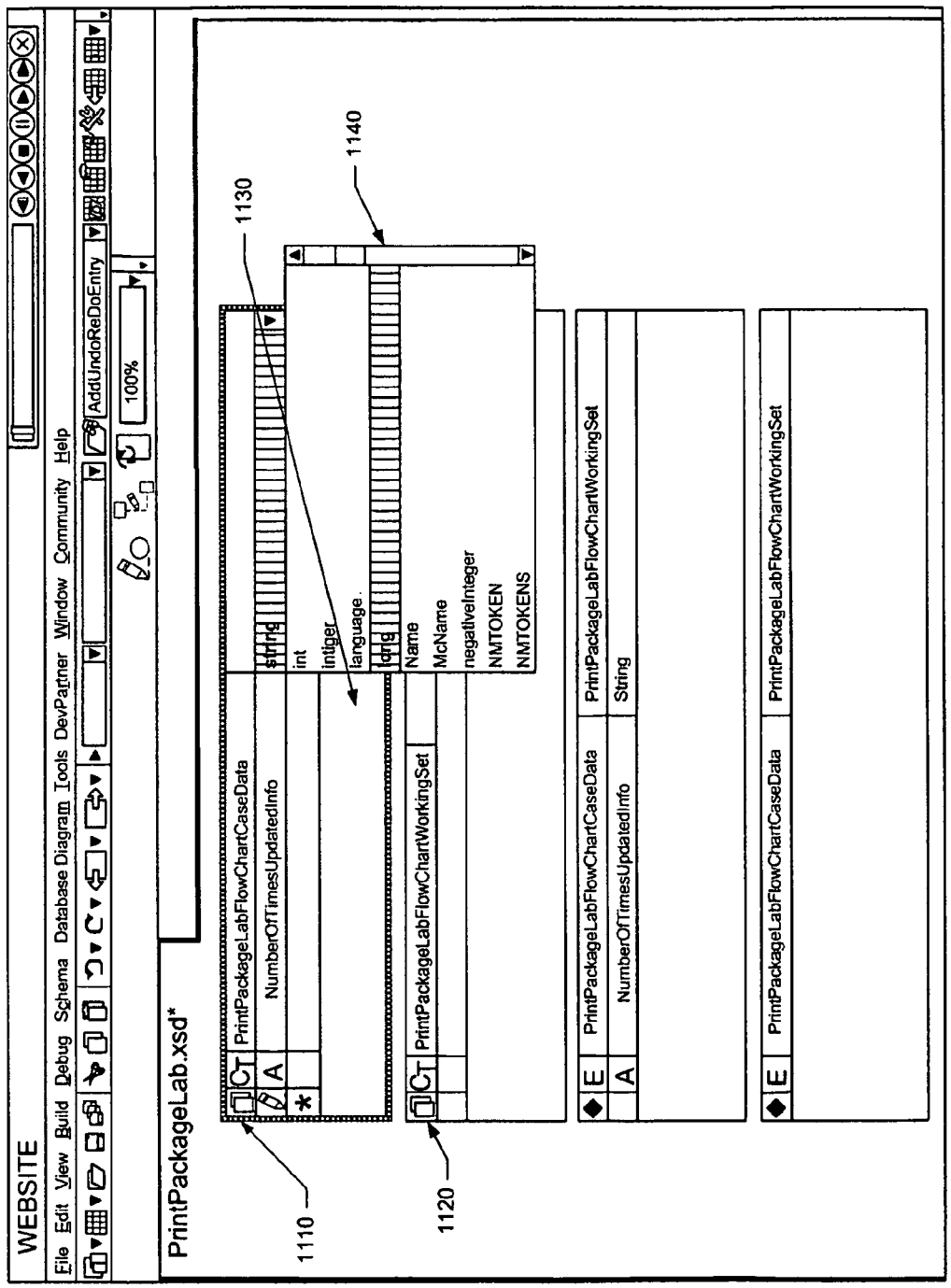

FIG. 11 is an illustration of a case data entry screen according to various embodiments of the invention.

Figure 12:
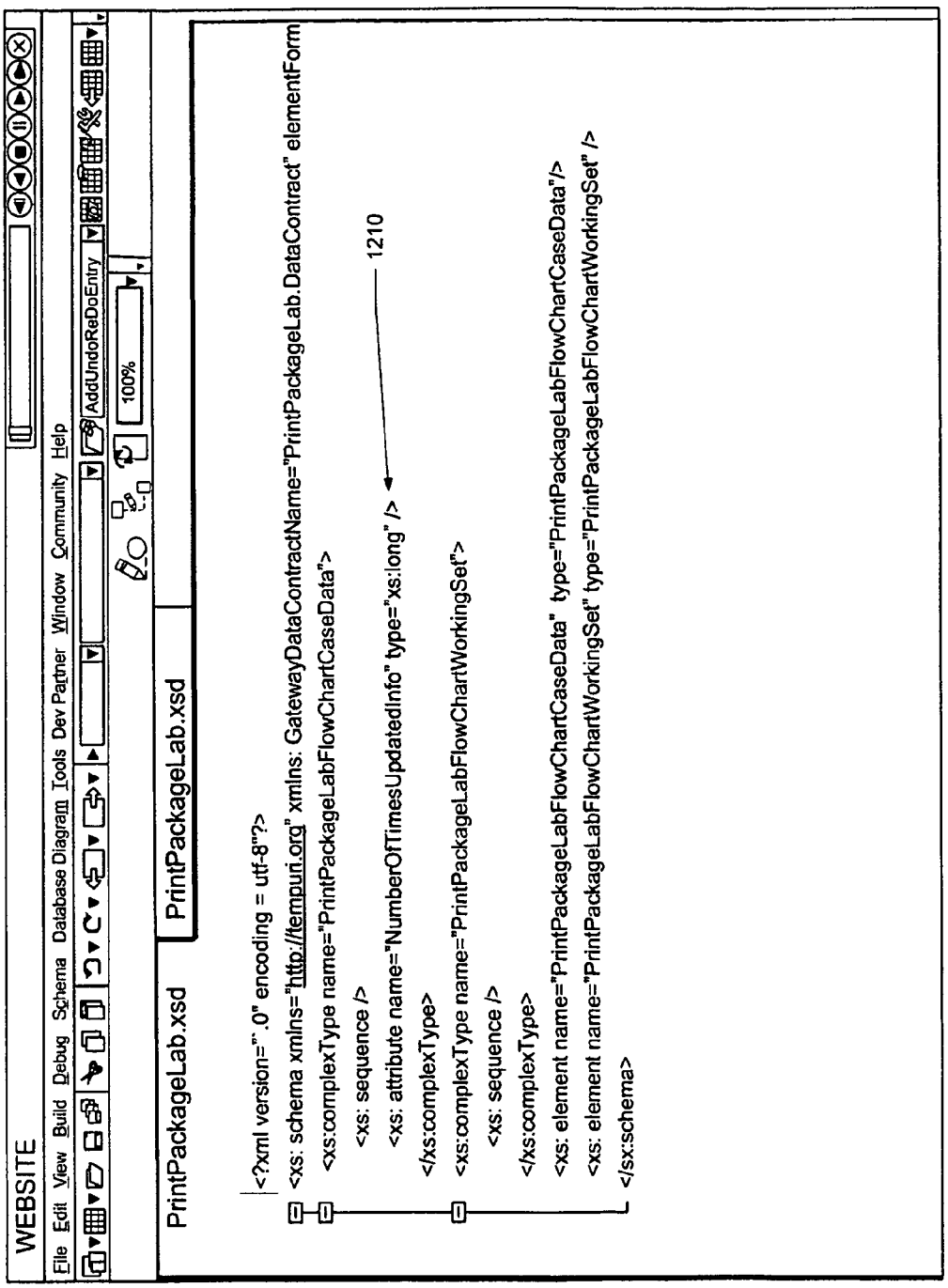

FIG. 12 is an illustration of generated XML according to various embodiments of the invention.

Figure 13:
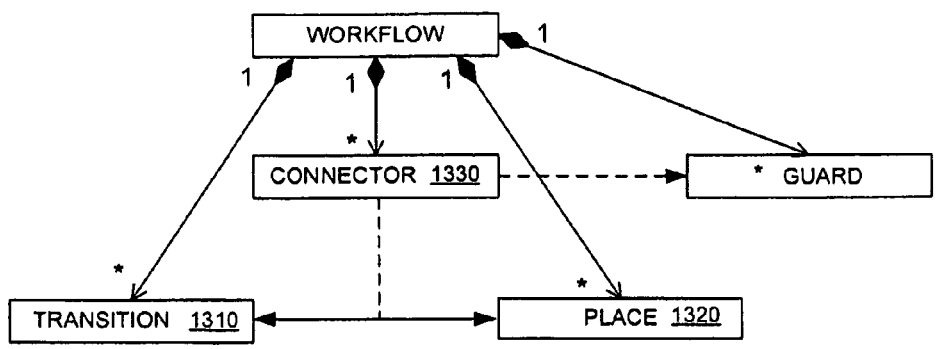

FIG. 13 is a diagram illustrating the base model for a workflow domain model according to various embodiments of the invention.

Figure 14:
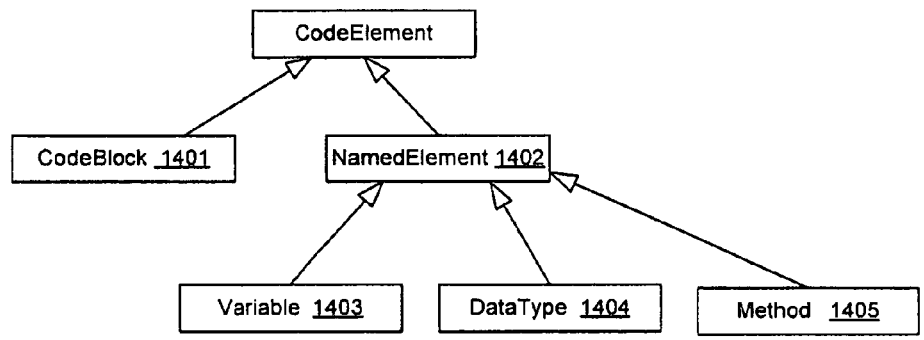

FIG. 14 is a diagram illustrating the base model for a target language domain model according to various embodiments of the invention.

Figure 15:
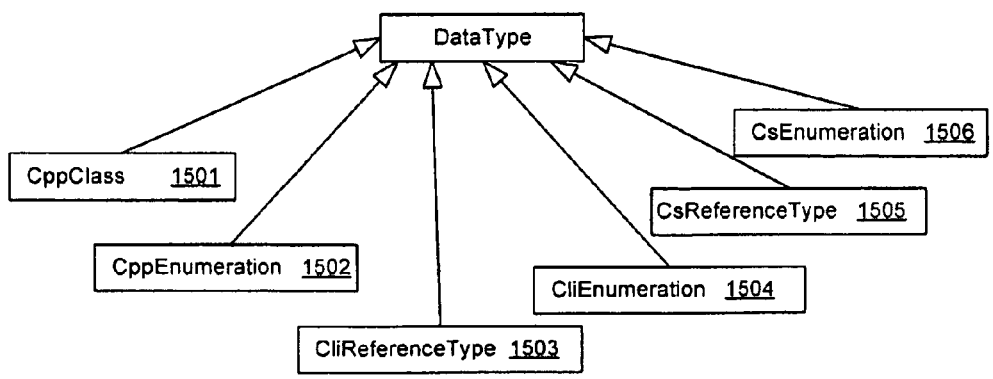

FIG. 15 is a diagram illustrating examples of objects in a target language domain model according to various embodiments of the invention.

Figure 16:
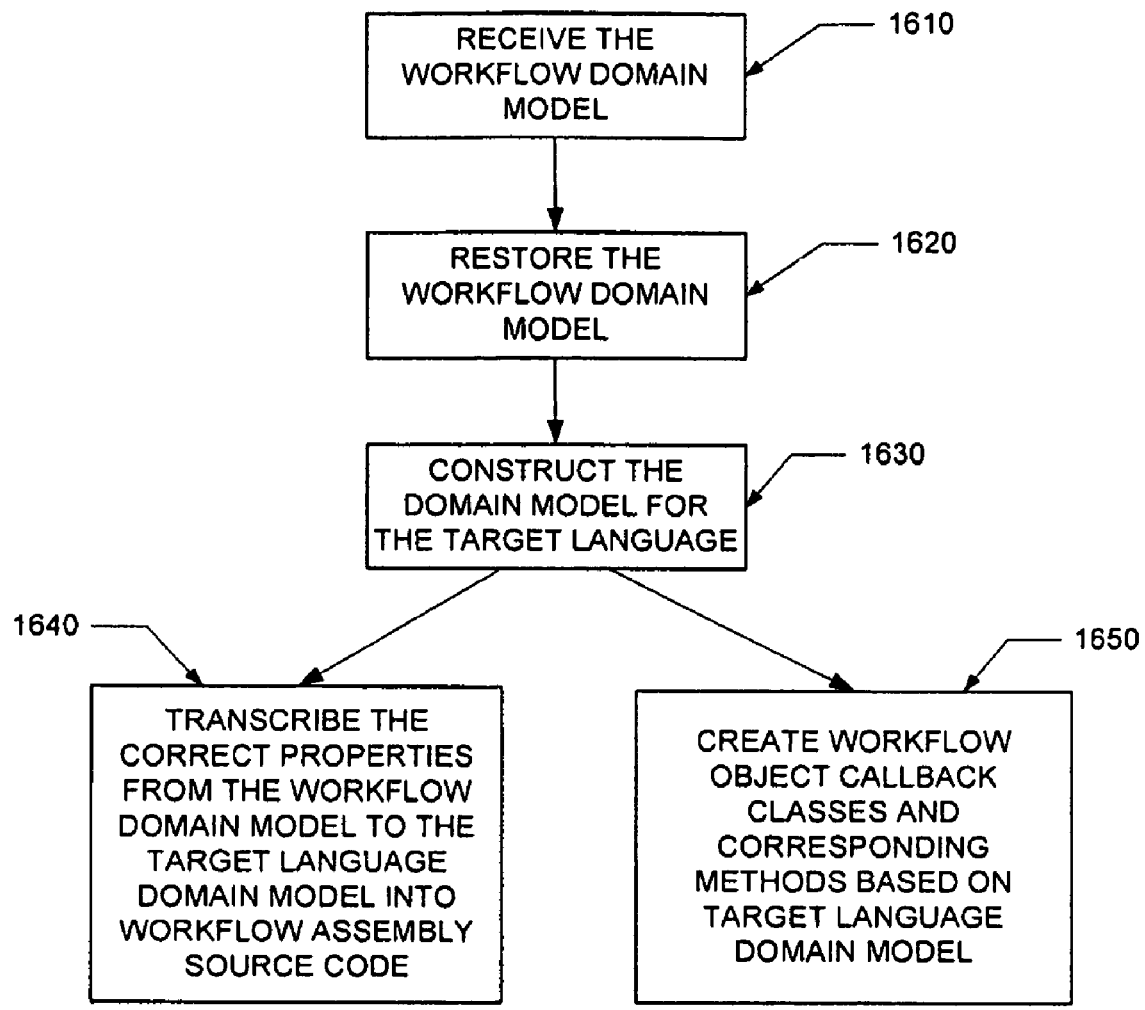

FIG. 16 is a flowchart illustrating a process for generating source code according to various embodiments of the invention.

Figure 17:
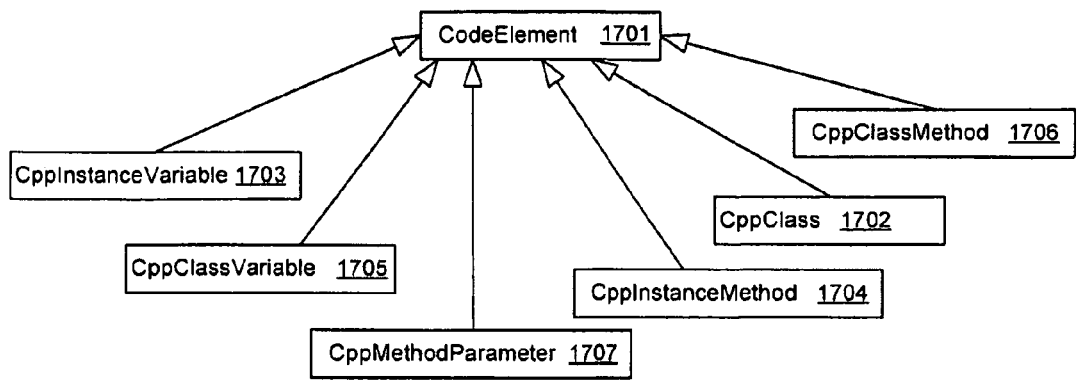

FIG. 17 is a diagram illustrating several important language elements in a target language domain model according to various embodiments of the invention.

Figure 18:
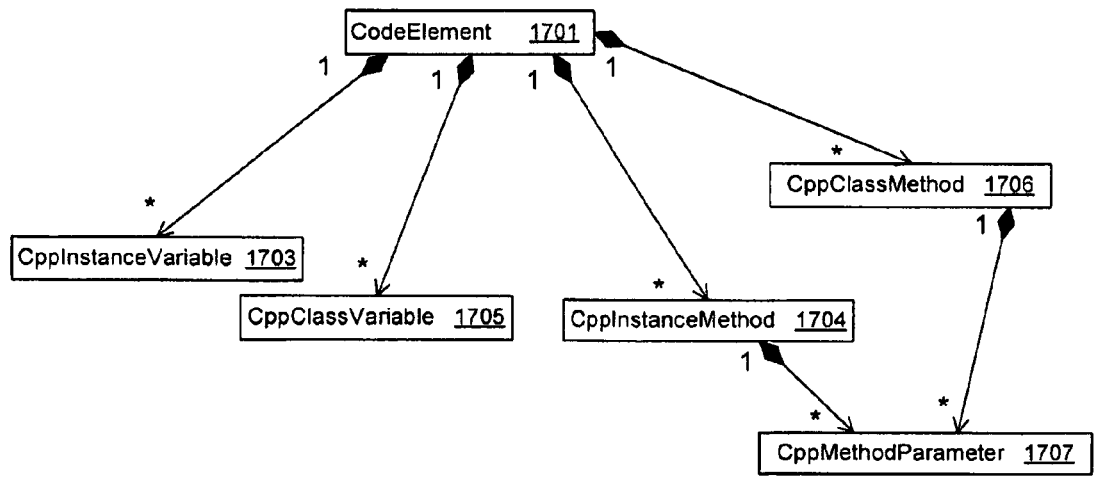

FIG. 18 is a diagram illustrating some of the compositional relationships provided in a target language domain model according to various embodiments of the invention.

Figure 19:
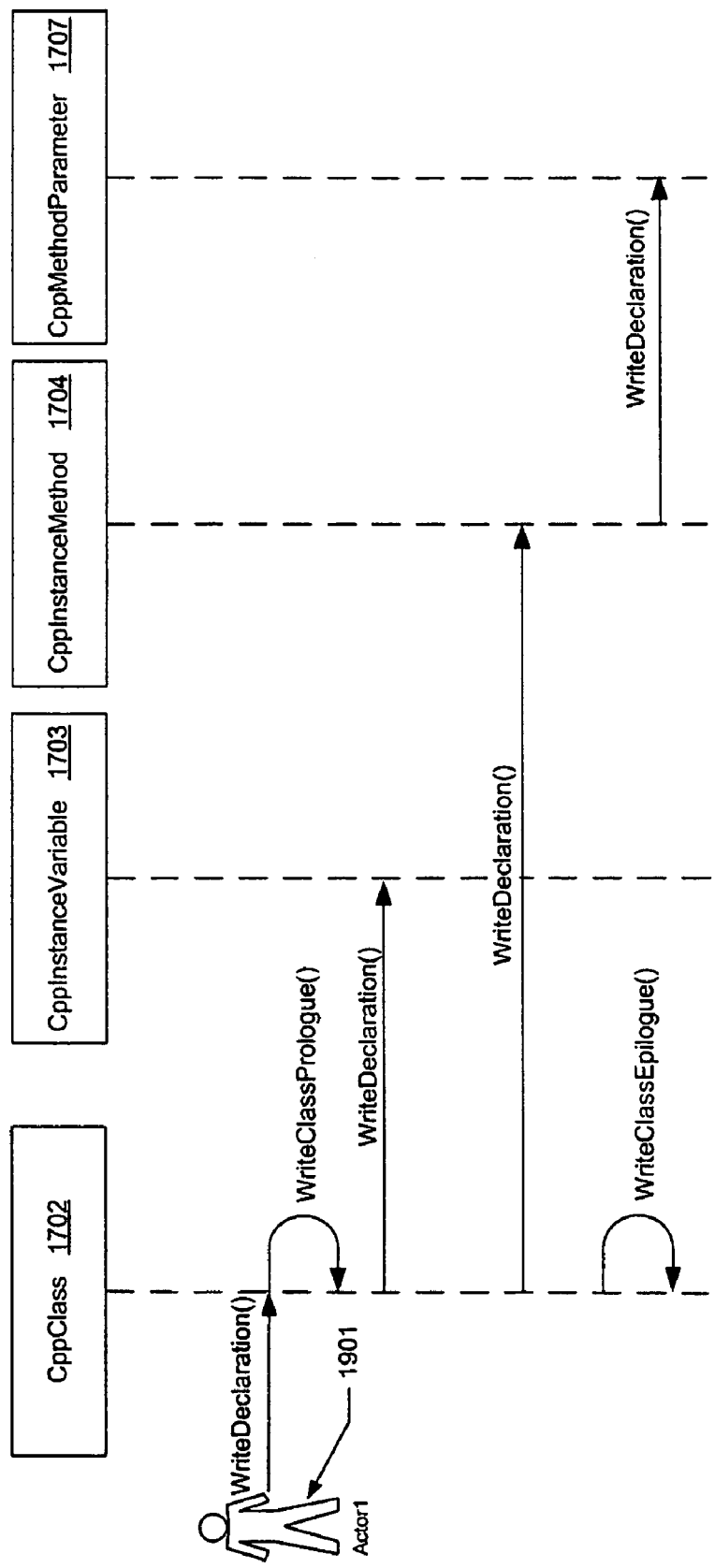

FIG. 19 is a diagram illustrating an example of how the declaration of a CppClass is written according to various embodiments of the invention.

Figure 20:
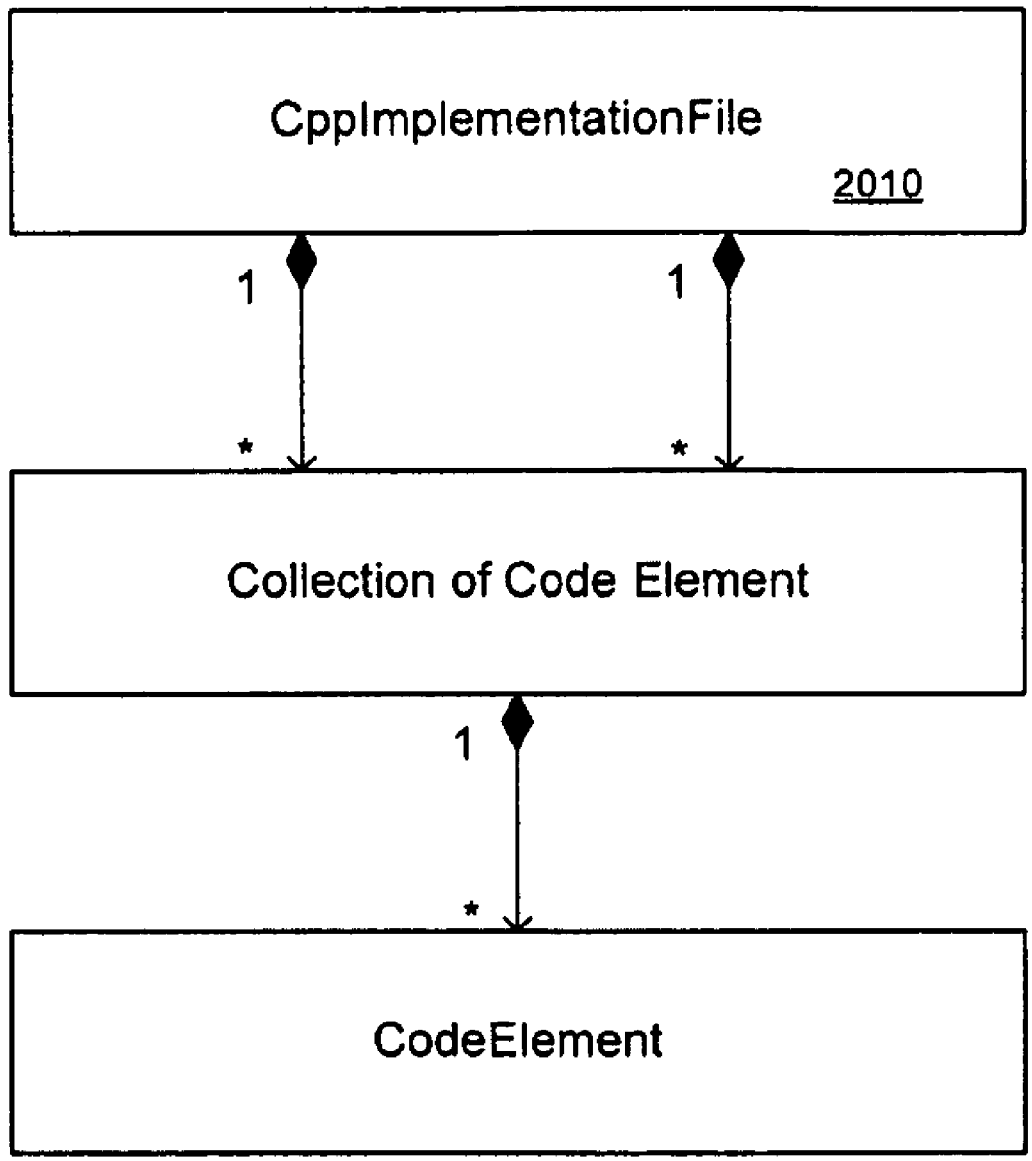

FIG. 20 is a diagram illustrating the containment relationship between CppImplementationFile and the other elements of a target language domain model according to various embodiments of the invention.

Figure 21:
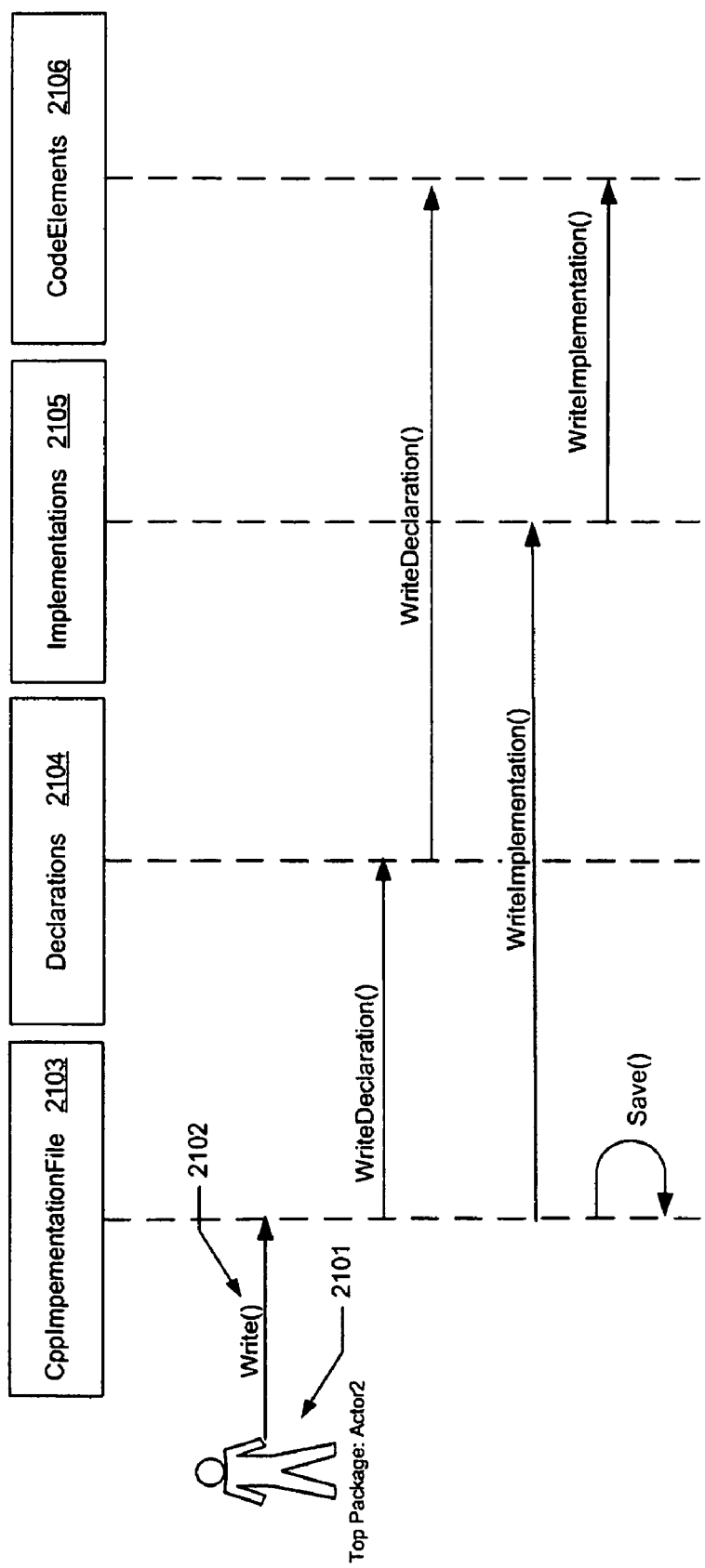

FIG. 21 is a diagram illustrating invoking a Write method on a file object according to various embodiments of the invention.

Figure 22:
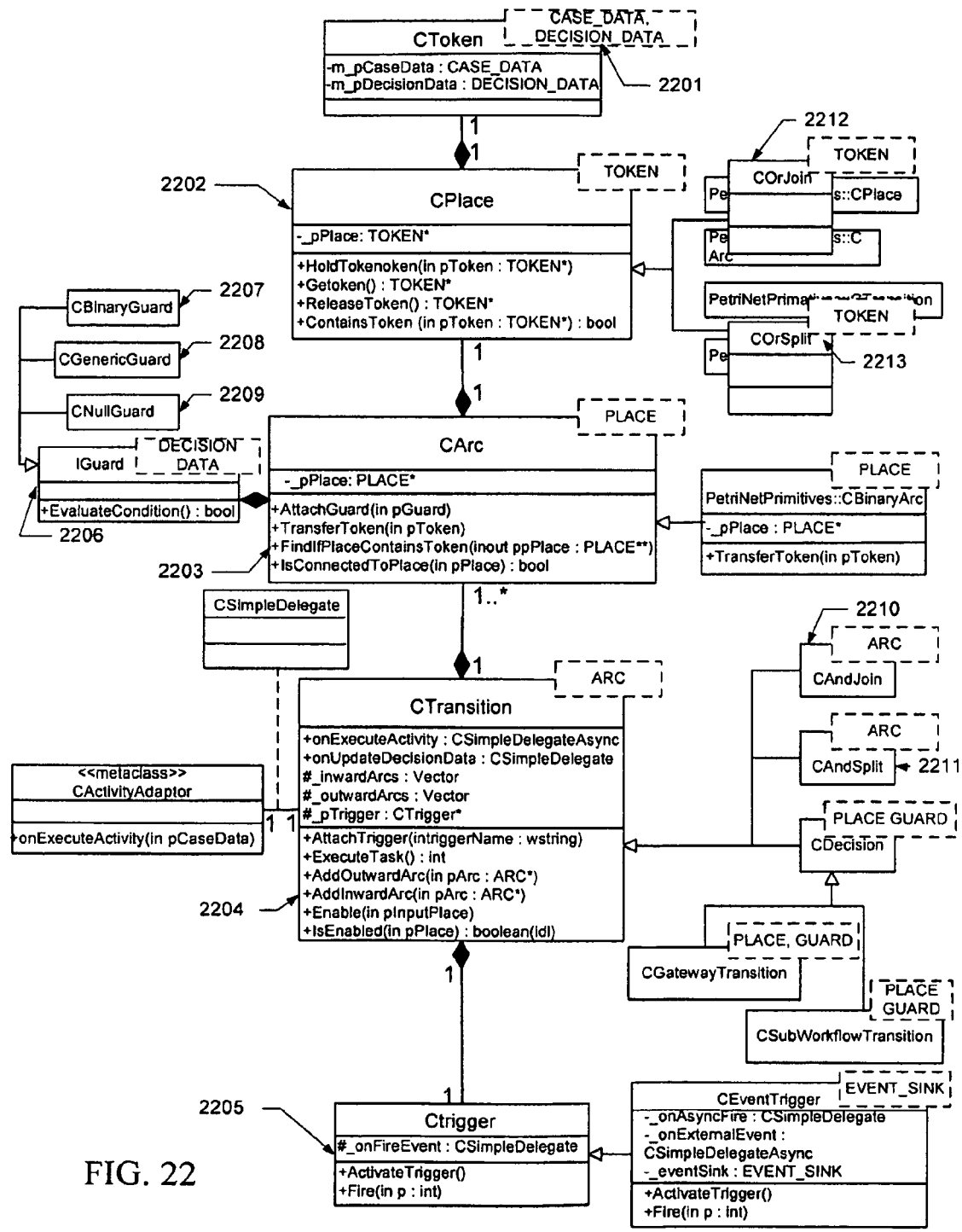

FIG. 22 is a diagram illustrating a C++ programming framework that represents a Petri net model according to various embodiments of the invention.

FIG. 23 is a diagram illustrating tracking objects according to various embodiments of the invention.

Figure 24:
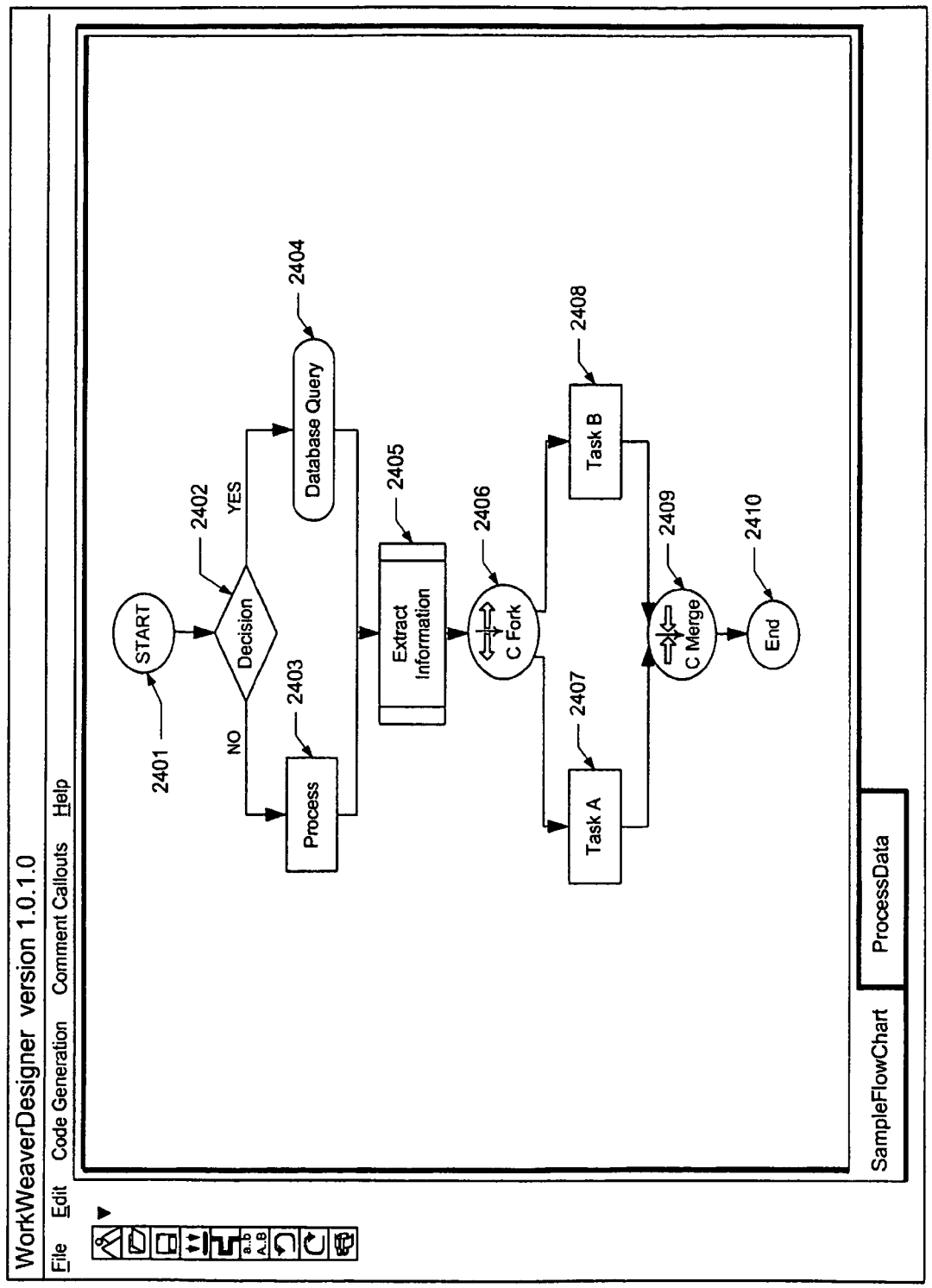

FIG. 24 is an illustration of a workflow diagram on a desktop workspace according to various embodiments of the invention.

Figure 25:
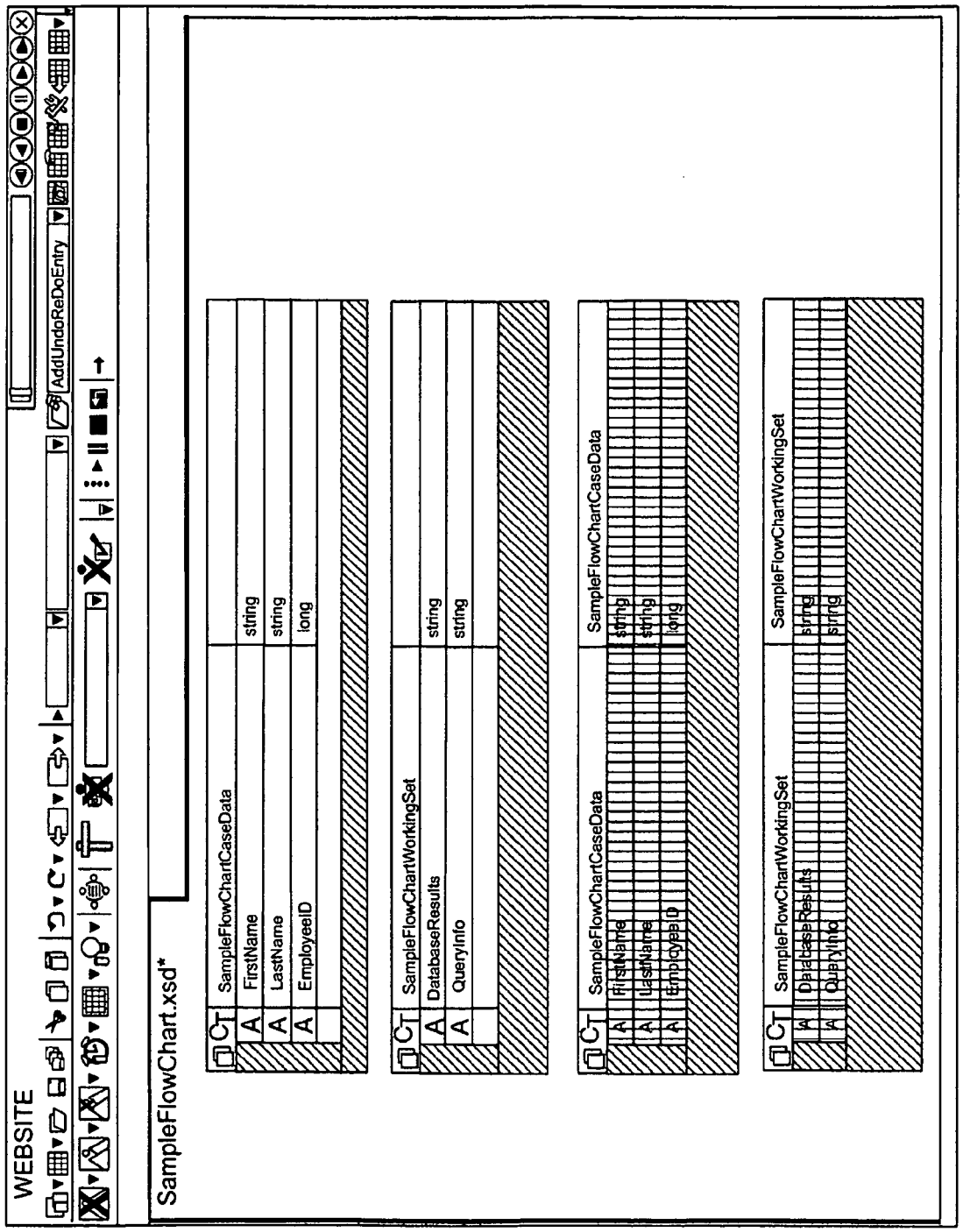

FIG. 25 is an illustration of case data for the workflow illustrated in FIG. 24 according to various embodiments of the invention.

FIG. 26 is an illustration of XML for the workflow illustrated in FIG. 24 according to various embodiments of the invention.

FIG. 27 is an illustration of generated C++ source code for the workflow illustrated in FIG. 24 according to various embodiments of the invention.

FIG. 28 is an illustration of generated C++ source code for the workflow illustrated in FIG. 24 according to various embodiments of the invention.

FIG. 29 is an illustration of generated C++ source code for the workflow illustrated in FIG. 24 according to various embodiments of the invention.

FIG. 30 is an illustration of generated C# source code for the workflow illustrated in FIG. 24 according to various embodiments of the invention.

FIG. 31 is an illustration of generated C# source code for the workflow illustrated in FIG. 24 according to various embodiments of the invention.

FIG. 32 is an illustration of generated C# source code for the workflow illustrated in FIG. 24 according to various embodiments of the invention.

Figure 33:
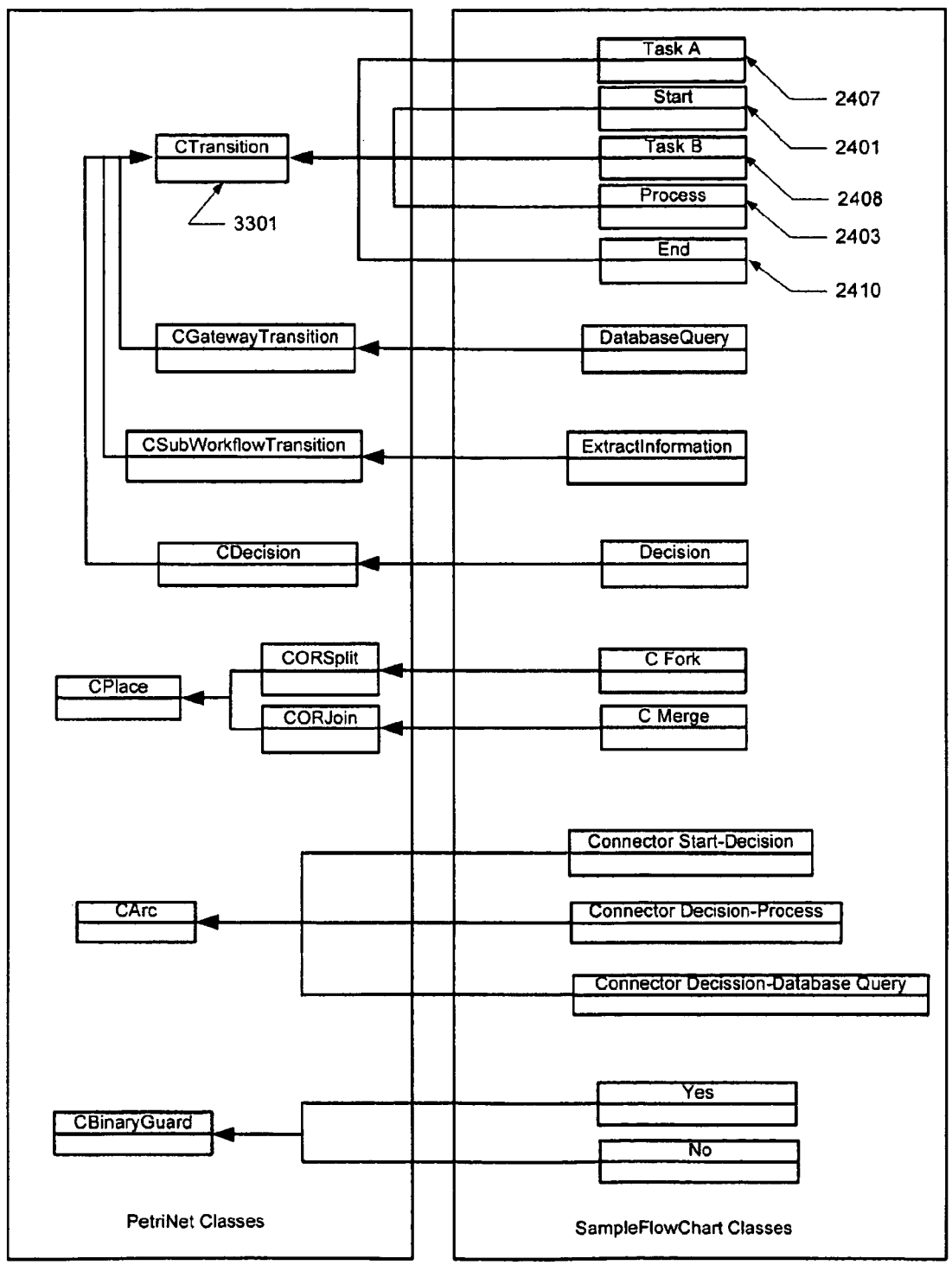

FIG. 33 is a diagram illustrating the mapping of the objects of the workflow illustrated in FIG. 24 to Petri net classes according to various embodiments of the invention.

Figure 34:
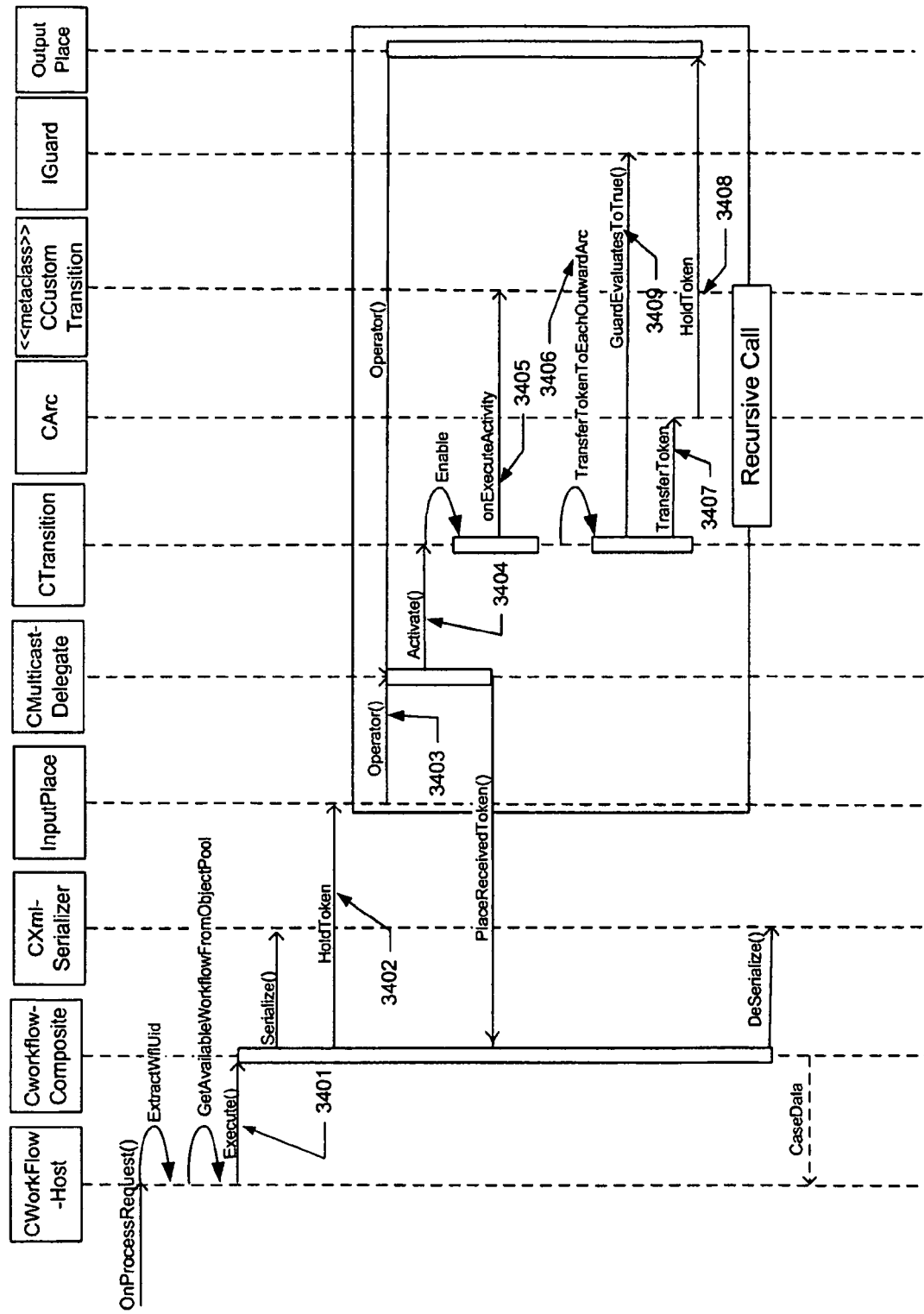

FIG. 34 provides an exemplary process for executing a request for the workflow illustrated in FIG. 24 according to various embodiments of the invention.

DETAILED DESCRIPTION OF VARIOUS EMBODIMENTS OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Like numbers refer to like elements throughout.

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Brief Overview

Various embodiments of the present invention provide systems and methods for enabling design, generation, and execution of a real-time workflow. For example, FIG. 1 provides an overview of an exemplary process to enable design, generation, and execution a real-time workflow model for a particular workflow. The process begins with building a representation of the particular workflow using a graphical designer executed by a computing device, shown as Step 110. This graphical designer provides a plurality of shapes that represent the various objects of a workflow that can be dragged and dropped onto a desktop workspace to model the workflow.

In various embodiments, the graphical designer also provides shapes to model various aspects of the workflow not found in previous graphical designer workflow tools. For instance, the graphical designer of various embodiments provides one or more shapes to indicate in the workflow where the workflow communicates with an external resource such as a database. In addition, the graphical designer of various embodiments provides one or more shapes to indicate concurrency within the workflow.

In Step 120, the process continues with converting the representation of the workflow built using the graphical designer into executable code. In various embodiments, a code generator executed by a computing device reads the representation of the workflow and converts the representation into executable code. In addition, in various embodiments, the code generator provides a framework capable of generating source code for multiple target languages. This is accomplished by combining the design pattern "bridge" and "builder" and employing two distinct domain models. Thus, the code generator can take a single representation of the workflow and can provide executable code in a plurality of source code languages such as C++, C#, .Net, or Java.

In Step 130, the process continues with executing the code to perform the particular workflow. In various embodiments, a workflow engine is employed to carry out this step. The workflow engine of various embodiments is executed on a computing device and is responsible for sequencing the workflow (e.g., the infrastructure of the workflow) and for calling a number of callback methods to implement the application specific level of the workflow.

In addition, the workflow engine of various embodiments is based on a Petri net mathematical model and on a microkernel architectural framework, and therefore is adapted to enable high performance business processes. That is, the Petri net microkernel of various embodiments is adapted to orchestrate a number of business processes that have an extremely short lifetime (e.g., in the order of milliseconds).

Finally, the process continues executing the workflow by delegating various tasks to the operating system of the computing device running the workflow engine to execute the tasks, shown as Step 140. For instance, the workflow engine hands over the callback methods associated with the different objects of the workflow to execute. This helps to minimize the overhead performed by the workflow engine in various embodiments.

Furthermore, in various embodiments, the workflow engine includes a platform abstraction layer that provides a transition layer from the Petri net language of the microkernel to the operating system language. As a result, the core engine of the workflow engine remains untouched as the workflow engine is moved from one operating system to another. Thus, the workflow engine of various embodiments is easily adaptable to run on any number of operating systems and on any number of devices.

System Architecture

An exemplary system 2 according to various embodiments of the invention is shown in FIG. 2. As may be understood from this figure, the system 2 includes a workflow engine device 200 and one or more external resources 210, 220, 230 that are connected via a network 270 (e.g., a LAN, the Internet, a wireless network, and/or a private network) to communicate with one another. In various embodiments, the workflow engine device 200 may be a server, a handheld device, or some other non-server machine. In addition, in various embodiments, the external resources 210, 220, 230 may be one or more databases or one or more devices, such as servers, workstations, or handheld devices. Furthermore, according to various embodiments, the system 2 also includes a graphical designer device 240.

In one embodiment of the invention, the workflow engine device 200 is configured for communicating (e.g., sending and receiving) data to the one or more external resources 210, 220, 230. In addition, in one embodiment, the graphical designer device 240 is configured for communicating data to the workflow engine device 200. In other embodiments, the workflow engine device 200, the external resources 210, 220, 230, and/or the graphical designer device 240 are one or more computers or software programs running on one or more computers.

FIG. 3 shows a schematic diagram of a workflow engine device 200 according to one embodiment of the invention. The workflow engine device 200 includes a processor 60 that communicates with other elements within the workflow engine device 200 via a system interface or bus 61. Also included in the device 200 is a display device/input device 64 for receiving and displaying data. This display device/input device 64 may be, for example, a keyboard or a pointing device that is used in combination with a monitor. The device 200 further includes memory 66, which preferably includes both read only memory (ROM) 65 and random access memory (RAM) 67. The device's ROM 65 is used to store a basic input/output system 26 (BIOS), containing the basic routines that help to transfer information between elements within the device 200. Alternatively, the workflow engine device 200 can operate on one computer or on multiple computers that are networked together.

In addition, the device 200 includes at least one storage device 63, such as a hard disk drive, a floppy disk drive, a CD-ROM drive, flash drive, or optical disk drive, for storing information on various computer-readable media, such as a hard disk, a removable magnetic disk, or a CD-ROM disk. As will be appreciated by one of ordinary skill in the art, each of these storage devices 63 is connected to the server bus 61 by an appropriate interface. The storage devices 63 and their associated computer-readable media provide nonvolatile storage. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. For example, as shown in FIG. 3, program modules of the workflow engine device 200 may include an operating system 80, a graphical designer module 300, and a workflow engine module 400. (Note that the graphical designer module 300 may reside on another device such as the graphical designer device 240 previously discussed.) The graphical designer module 300 and workflow engine module 400 may be used to control certain aspects of the operation of the workflow engine device 200, as is described in more detail below, with the assistance of the processor 60 and the operating system 80.

Also located within the device 200 is a network interface 74, for interfacing and communicating with other elements of a computer network. It will be appreciated by one of ordinary skill in the art that one or more of the device's 200 components may be located geographically remotely from other device 200 components. Furthermore, one or more of the components may be combined, and additional components performing functions described herein may be included in the system 2.

Exemplary System Operation

As mentioned above, the system 2 according to various embodiments enables design, generation, and execution of real-time workflows. In particular, in various embodiments, the workflow engine device 200 includes a graphical designer module 300 and a workflow engine module 400. FIG. 4 depicts the architecture of the workflow engine device 200 according to an embodiment of the invention. In this depiction, the graphical designer module 300 includes several different components: (1) graphical designer components 310; (2) code generator components 320; (3) compiler components 330; (4) state machine builder components 340; and (5) flow chart builder components 350. In addition, the workflow engine module 400 shown in FIG. 4 is broken down into two sets of components. The first set of components (shown in FIG. 4 as the runtime components) include: (1) Petri net microkernel components 410; (2) object pool components 420; (3) tracking components 430; (4) state management components 440; and (5) garbage collection components 450. The second set of components (shown in FIG. 4 as the platform abstraction layer components) include: (1) delegate components 460; (2) thread pools components 470; (3) communication components 480; (4) instrumentation components 490; (5) concurrency primitives components 491; and (6) serialization components 492. It should be noted that these components need not be present on the same machine (e.g., be stored in memory on the same computer). For example, the graphical designer module 300 and corresponding components may be stored on a separate machine such as the graphical designer device 240 shown in FIG. 2.

In general, the graphical designer module 300 of various embodiments is configured to provide a desktop workspace and a plurality of shapes selectively dragged and dropped onto the workspace to model a particular workflow so that the model of the workflow can be converted into code the workflow engine module 400 can execute. The workflow engine module 400 of various embodiments is configured to execute a real-time workflow and communicate information (e.g., data) between one or more external resources 210, 220, 230 as instructed by the workflow. These modules 300 and 400 and corresponding components are discussed in more detail below.

Graphical Designer Module

As discussed above, various embodiments of the graphical designer module 300 include several different components: (1) graphical designer components 310; (2) code generator components 320; (3) compiler components 330; (4) state machine builder components 340; and (5) flow chart builder components 350. This module 300 may be stored in RAM memory 67 and executed by the processor 60 in the device 200 shown in FIG. 3 according to various embodiments. Further details of the various components are provided below.

Graphical Designer Components

The graphical designer components (graphical designer) 310 according to various embodiments provide a desktop workspace on which a designer builds a flow chart (or state machine) that represents a particular workflow. The flow chart is a definition of discrete processes linked together to represent the workflow's path. Shown in FIG. 5, there are several types of shapes 510 that may be selectively dragged and dropped onto the workspace 500.

Each shape 510 expresses the performance of at least one predefined role in a workflow process. For example, the embodiment of the available shapes 510 shown in FIG. 5 include: (1) Start; (2) Process; (3) Decision; (4) Gateway; (5) SubWorkflow; (6) Conditional Merge; (7) Conditional Fork; (8) Parallel Fork; (9) Parallel Merge; and (10) End. In addition, each shape 510 has different attributes. For instance, the basic attributes for the Process shape are to either execute right away or execute after a timeout. The designer can drag and drop the Process shape 520 onto the desktop workspace 500 as shown in FIG. 5. The designer can then perform a right-click on the Process shape 520 to bring up a property page for the process shape 520. This allows the designer to set the timeout attribute for the particular Process shape 520. In addition, the designer can provide a name for the Process shape 520 on the property page such as "READ SCANNED INFORMATION" that is descriptive of the process performed represented by this shape 520 of the workflow.

The designer continues to build the flow chart of the particular workflow. For example, the designer may drag and drop a Decision shape 610 onto the desktop workspace 500 after the Process shape 520 as shown in FIG. 6. The Decision shape 610 represents a condition that is placed in the workflow. In this case, the designer names the Decision shape 610 "WANT TO UPDATE INFO?" In addition, the designer places one or more subsequent shapes 510 following the Decision shape 610 and the Decision shape 610 represents a position in which the particular workflow branches into separate paths. Thus, the workflow follows a path to one or more of the shapes 510 based on the condition placed on the Decision shape 610. The logic implemented to define the condition is described in greater detail below. In FIG. 6, the designer has dragged and dropped a subsequent Process shape 620 named "PRINT PACKAGE LABEL" following the Decision shape 610.

In various embodiments, connectors are also placed between shapes 510 to represent the directional path of the workflow. In the case of the Decision shape 610 shown in FIG. 6, the designer places a branch condition on the connector 630 between the Decision shape 610 and the subsequent Process shape 620. For example, the designer selects the branch condition "NO" on the property page for the connector 630 between the Decision shape 610 and the Process shape 620 entitled "PRINT PACKAGE LABEL," as shown in FIG. 6. This is further shown in FIG. 7. Thus, when the workflow is executed, the workflow branches to the process "PRINT PACKAGE LABEL" if the condition on the decision "WANT TO UPDATE INFO?" is determined to be no.

FIG. 7 displays the completed flow chart for the workflow. This particular flow chart represents a workflow for printing a package label. In various embodiments of the graphical designer module 300, the connectors placed between shapes 510 are based on line routing logic that produces connectors that take the shortest and most direct path between two shapes. The connectors automatically adjust on the desktop workspace 500 and automatically go around a shape 510 placed in the way between two shapes 510 connected in the workflow. The designer accomplishes this by selecting a group of shapes 510 and right-clicking on the desktop workspace 500 to "align" the connectors 810 as shown in FIG. 8. The module 300 aligns the connectors automatically and the result is shown in FIG. 9. In various embodiments, such capability provides the advantage of organizing a flow chart placed on the desktop workspace 500 for a complex workflow because it produces a more clean and precise representation of the workflow that is easier to follow for the designer.

In addition to providing a flow chart representation of the workflow, the graphical designer 310 also accepts data from the designer associated with the particular workflow according to various embodiments. For instance, the designer right-clicks on the surface of the desktop workspace 500 and the module 300 brings up the property page 1010 for the workflow, as shown in FIG. 10. The developer selects the link 1020 to the data contract for the workflow. The module 300 then brings up the screen shown in FIG. 11. On this screen, the designer can enter data for two types of data: (1) case data 1110; and (2) working set 1120. The case data 1110 is the inputs to the workflow and the outputs of the workflow result. The working set 1120 is data that is used only internally by the workflow. Thus, a workflow object can convey additional data to another object in the workflow by modifying the data in the working set 1120 when the object executes.

In the example shown in FIG. 11, the designer has added the variable "NumberOfTimesUpdatedInfo" 1130 to the case data 1110 and selected the variable type as "long" 1140. Once the designer has finished entering the data, the graphical designer module 300 saves the data to an XML schema file as shown in FIG. 12. As a result, the variable "NumberOfTimesUpdatedInfo" 1130 is saved to the file as an attribute 1210.

In addition to building workflows on the desktop workspace 500, the graphical designer module 300 is also adapted in various embodiments so that a designer can build a state machine model as well. A state machine is a model of behavior composed of a finite number of states, transitions between states, and actions. A state stores information that reflects input changes from the system start to the present moment. A transition indicates a state change and is described by a condition that needs to be fulfilled to enable the transition. An action is a description of an activity that is to be performed at a given moment. In various embodiments, the graphical designer module 300 provides the shapes: (1) Start State; (2) End State; (3) State; (4) Transition; (5) Conditional Merge; (6) Conditional Fork; (7) Parallel Merge; and (8) Parallel Fork.

As previously discussed, a need exists for a workflow product that allows a designer to design high performance, short duration workflows and that can execute such workflows. Various embodiments of the graphical designer module 300 allow modeling of real-time applications by bringing forward aspects not typically found in a visual designer. For instance, in one embodiment, the graphical designer module 300 includes a shape 510 called a Gateway. This Gateway shape allows a designer to model a workflow by including in the flow chart connections to external resources such as computer systems and/or databases. In general, a gateway is an object that is configured to connect to an external resource. Thus, a gateway may indicate where in the workflow the workflow engine relies on an external application program interface (API) to communicate with the external resource.

For example, the designer drags and drops a Gateway shape onto the desktop workspace 500 to model in the flow chart where in the workflow the process leaves the workflow to access a resource external to the workflow such as a different computer system or database. As is described in more detail below, the graphical designer module 300 of various embodiments converts the flow chart into executable code. In turn, the workflow engine module 400 of various embodiments executes the code to run the workflow, and without any further development in the source code, the workflow engine module 400 executes delegation to the operating system to communicate with the external resource.

In many commercial workflow products, the components to communicate with the external resource are typically embedded in the source code language and must be written by the source code developer. As a result, in many cases, the developer is required to write a great deal of this code by hand. However, by providing a Gateway shape at the designer level and managing the delegation of communicating with the external resource at the engine level, the implementation of a gateway is surfaced to the architecture level, and as a result this greatly simplifies the source code development in various embodiments of the invention.

In addition, the graphical designer module 300 of various embodiments also provides one or more shapes to express concurrency within a workflow. For instance, one embodiment of the graphical designer component includes the shapes 510 Conditional Merge, Conditional Fork, Parallel Merge, and Parallel Fork to model concurrency within a workflow. According to an embodiment, the Conditional Fork shape and the Parallel Fork shape model in the workflow where the path of the workflow branches into two separate paths with each path leading to a different shape, such as a Process shape, for example. In conjunction, the Conditional Merge shape and the Parallel Merge shape model in the workflow where the two separate paths converge back into a single path. The difference between the Parallel shapes and the Conditional shapes is the use of the Parallel shapes models that whatever lies on the two separate paths must complete before the workflow is allowed to continue at the Merge. For example, Process A may be on one path of the Parallel Fork and Process B may be on the other path of the Parallel Fork. Therefore, if the workflow engine module 400 executes the workflow with this particular concurrency, the workflow engine module 400 executes Process A and Process B, and waits for each Process to complete before continuing with executing the remainder of the workflow. In contrast, for the Conditional shapes, the workflow engine module 400 waits for either Process A or Process B to complete before the workflow engine module 400 continues executing the workflow. Therefore, if Process A finishes prior to Process B finishing, the workflow engine module 400 does not wait for Process B to complete before the module 400 continues to execute the workflow.

As is the case with the Gateway shape, in various embodiments, the designer drags and drops the concurrency shapes onto the desktop workspace 500 to model concurrency within the workflow. In turn, as is described in more detail below, the graphical designer model 300 generates executable code to indicate the concurrency in the workflow, and the workflow engine module 400 executes the code to run the workflow and actually manages the concurrency within the workflow. Thus, the source code developer does not need to write anything within the source code to manage the concurrency modeled in the workflow by the designer.

In many cases, the writing of such code (e.g., multi-threaded code) is fairly complex, very tedious, and error prone even for an experienced developer. Thus, by bringing the implementation of concurrency up to the designer level and by having the workflow engine module 400 execute concurrency management, the developer does not need to write code to perform this task. As a result, various embodiments of the invention allow for the generation of workflow executable code much faster than typical commercial workflow products and with less error.

XML Schema

Once the designer has completed designing the workflow on the desktop workspace 500, the designer selects the "code generate" button on the designer screen in various embodiments. The graphical designer module 300 of various embodiments includes components that take the workflow and construct an in-memory workflow domain model based on the workflow designed on the desktop workspace 500 and serialize the model to XML. This representation includes the various objects of the workflow along with the connectors between the workflow objects.

As previously discussed, two types of workflows are supported in various embodiments, flow charts and state machines. The workflow domain model is composed of a base model which represents a Petri net and two derivatives of the base model (one for flow charts and one for state machines). A Petri net is one of several mathematical modeling languages used to describe discrete distributed systems. In particular, a Petri net may be defined as a graphical depiction (e.g., bipartite graph) of the structure of a distributed system. A Petri net includes places, transitions, and arcs. Arcs run between places and transitions, but not between places and places or transitions and transitions. FIG. 13 provides a simplified view of the base model. As one can see in FIG. 13, the base model (workflow) is composed of the basic components of a Petri net such as a transition 1310, place 1320, and connector (arc) 1330.

As previously discussed, the developer models the workflow using the graphical designer 310 as either a flow chart or a state machine. In turn, the graphical designer 310 models flow charts and state machines as classes derived from the base model (workflow). Thus, there are several specializations of transition and place, which are part of the base model workflow. The flow chart and the state machine models simply place restrictions on which of these specializations the developer can add to the workflow based on the rules of flow charts and state machines. As a result, in various embodiments, the workflow domain model is derived from a set of classes wherein each class represents a particular object of the workflow, these objects dependent on whether the workflow is a flow chart or a state machine.

Code Generator Components

The code generator components 320 (code generator) of various embodiments provide a framework capable of generating source code for multiple target languages. This is accomplished by combining the design pattern "bridge" and "builder." In addition, the code generator 320 employs two distinct domain models according to various embodiments. One of the domain models represents the workflow (e.g., the XML workflow domain model discussed above) and the other domain model represents the target programming language (target language domain model). In various embodiments, the builder pattern is used to bridge the two domain models to together. These aspects are described in further detail below.

As discussed, various embodiments of the code generator 320 make use of a target language domain model to represent the target programming language. This model encapsulates elements representing artifacts (features) of a specific target language. In various embodiments, the target language domain model is composed of a base model and a derivative for each target language. The base model contains abstractions common to all supported target languages. For instance, FIG. 14 provides a simplified view of such a base model.

The objects in the target language domain model for each target language are based on those objects found in the base model. The responsibility of these objects is to produce artifacts in the source files specific to the syntax of the particular target language. For instance, FIG. 15 provides some examples of objects in the target language domain model for three specific target languages. The objects CppClass 1501 and CppEnumeration 1502 support C++, the objects CliReferenceType 1503 and CliEnumeration 1504 support C++/CLI, and the objects CsReferenceType 1505 and CsEnumeration 1506 support C#.

In one embodiment, the target language domain model is derived from a set of classes that represent the objects (features) of the target language. For example, the set of classes may be C# classes and the target language may be C++. Therefore, a C# class is developed for each feature of the C++ language such as a class method, a class variable, and a method parameter. The code generator 320 is configured to traverse through the list of all of the objects of the workflow and to generate source code for each of the objects. It should be appreciated that the source code for the code generator 320 does not necessarily need to be C# but may be any number of programming languages such as C++ or .Net in light of this disclosure.

As a result of the workflow domain model and the target language domain model being two separate models, the workflow domain model of various embodiments does not carry with it any information about what the source code to be generated is going to look like. In addition, the workflow domain model provides no information to indicate what methods need to be generated. Thus, the abstraction of the workflow (e.g., the workflow domain model) is decoupled from its implementation (e.g., the target language domain model) and the two can vary independently.

As a result, the developer can generate source code in multiple languages from a single description of the workflow. Thus, in various embodiments, the designer can encode business logic into the diagram of the workflow developed via the graphical designer component 310 and this diagram of the workflow can be used to build a program that can be executed by applications running on multiple platforms. Therefore, the most expensive aspect (e.g., the business logic of the workflow) of the program is designed only once, in many cases, and is encoded in a language independent of the target language.

In general, a builder design pattern allows an object to have multiple representations. Accordingly, the code generator 320 includes a builder component that allows the code generator 320 to manipulate a single in-memory representation of the workflow domain model to any one of a number of target languages. In particular, the builder component is responsible for using the workflow domain model as a "requirements document" and the target language domain model as a "toolbox" to generate source code. Thus, the builder component "bridges" the workflow domain model to the target language domain model. As a result, the code generator 320 provides source code expected by the workflow engine module 400, as well as provides source code that implements the process flow described in the workflow domain model.

In addition, the builder of various embodiments also includes a class called the director. The director's job is to wire all of the objects (e.g., classes) of the workflow in the right sequence. As a result, the developer is not required to write the source code for sequencing the steps of the workflow. The director class includes one or more methods to assemble the workflow as a sequence of classes that are invoked by the workflow engine module 400 upon execution. Thus, upon kick off of the workflow engine module 400, the engine 400 effectively traverses a link list of the classes (e.g., C++ classes) built in memory as an object graph and invokes each of the classes as it traverses the graph.

Furthermore, the builder of various embodiments also translates the representation of the workflow based on multiple platforms. For example, if a developer wants to generate C++ code for the workflow and execute the code on a device running a Window® operating system and on a device running a Linux® operating system, the generated code will need to look different for each machine because the compilers for both platforms are different. Thus, the code generator 320 of various embodiments includes a builder for Microsoft® C++ and a builder for Linux® C++.

As a result, the code generator 320 of various embodiments provides three levels of decoupling. The workflow domain model is decoupled from the target language domain model and the target language domain model is decoupled from the platform specific aspects. Therefore, if the developer wants to add a builder for a new platform, the developer does not need to change the aspects of the workflow domain model and the target language domain model. The only part the developer needs to develop is a new builder to account for the specific aspects of the new platform.

Generating Source Code Using the Code Generator

FIG. 16 illustrates a flow diagram of a process for generating source code according to various embodiments of the invention. This flow diagram may correspond to the steps carried out by the processor 60 in the device 200 shown in FIG. 3 as it executes the code generator components 320 of the graphical designer module 300 in the device's 200 RAM memory 67 according to various embodiments. In general, the code generator 320 of various embodiments is analogous to the back end of a compiler. The input is the workflow domain model (rather than a parse tree) and the output is source code (rather than object code).

Beginning at Step 1610, the graphical designer 310 invokes the code generator 320 and the code generator 320 receives the workflow domain model (e.g., as an XML schema file) and several parameters indicating the target language from the graphical designer 310. In response, the code generator 320 restores the workflow domain model from the XML schema file by using a serializer (such as, for example, the XmlSerializer class provided by .Net which implements the infrastructure to serialize .Net objects from XML) and passes the restored domain model to the builder component, shown as Step 1620. In response, the builder constructs the domain model for the target language by creating instances of the appropriate class for each workflow object of the workflow and transcribing the properties associated with each object from the workflow model to the target language domain model, shown as Step 1630.

For instance, in one embodiment, the set of classes are C# classes. Thus, the builder reads each element in the restored workflow domain model and creates a C# class that carries with it the XML description of the workflow for the particular element.

In Step 1640, the builder generates the target language domain model into workflow assembly source code. Thus, as previously mentioned, the builder of various embodiments "bridges" the workflow domain model to the target language domain model. The generated workflow assembly source code implements the flow of the business logic of the workflow. Thus, the workflow assembly source code includes the work activities of the workflow and how the activities are wired together.

In addition to creating the workflow assembly source code, the code generator 320 of various embodiments also creates workflow object callback classes and corresponding callback methods based on the target language domain model, shown as Step 1650 in FIG. 16. These callback methods serve as skeletons for the developer to write content to as needed for the specific workflow application. In one embodiment, the code generator 320 generates each callback method with a stub implementation. That is, the code generator 320 includes code in the method to throw an exception, e.g., to create an error if the code is executed. This ensures that the developer does not accidentally forget to implement one of the callback methods. Thus, the developer deletes the code to throw an exception when the developer writes the code for the particular method.

For example, the workflow may include a task to query a database. The designer represents this task on the desktop workspace 500 as a gateway to instruct the workflow engine module 400 to delegate the communication with the database to the operating system. The code generator 320 generates a callback class for this task that includes the method "on execute" with a reference to the case data for the workflow. As described, this method serves as the skeleton and the developer enters the code to query the database. Therefore, if the workflow engine module 400 executes the code for this workflow and comes to this particular task, the workflow engine 400 delegates to the operating system to communicate with the database and to execute the method "on execute" to query the database.

According to one embodiment, the code generator 320 is also configured to round-trip engineer the one or more implementation files that include the implementation of the callback methods. Thus, if the code generator 320 re-generates executable code for a particular workflow, the code generator 320 does not just simply write over the one or more implementation files that include the implementation of the callback methods. Instead, the code generator 620 first reads the one or more implementation files and extracts the code from the files that the developer has written. Then, if the code generator 320 regenerates the one or more implementation files, the code generator 620 inserts the extracted code into the newly regenerated files. As a result, the code written by the developer is preserved.

C++ Domain Model for Code Generator Component

As previously mentioned, various embodiments of the code generator component 320 make use of a C++ target language domain model to generate C++ source code executable by a workflow engine module 400 accepting such code. This is particularly advantageous in various embodiments because, with regard to other programming languages, C++ executes more quickly and therefore it is ideal for implementing real-time workflows.

A particular embodiment of the C++ domain model simplifies the forward generation of this C++ source code by treating the source code files containing C++ language features as de-facto elements of the C++ language. In short, this is accomplished by applying the design pattern "composite" to both language features and source code files.

C++ is a compiled, general purpose programming language which employs static, unsafe, nominative data typing. Data types must be declared before they are used. For some data constructs, such as class, separating declaration from definition (e.g., implementation) in the source code is preferred.

C++ source code is stored in files referred to as source files. Standard C++ defines two types of source files known as header files and implementation files. For example, most compilers expect header files to end with the extension ".h" and implementation files to end with the extension ".cpp." By convention, but not necessity, class declarations are typically placed in ".h" files and class implementations are placed in ".cpp" files. However, for technical reasons, it is not uncommon for either ".h" files or ".cpp" files to contain both declarations and implementations.

C++ compilers treat header files and implementation files somewhat differently. An implementation file references header files to provide declarations available to the implementation file. The header file is not processed by the compiler, but is included in the build and thus in the final executable program. As a result, there is a many-to-many relationship among ".h" files and ".cpp" files. A ".cpp" file may need to reference multiple ".h" files to ensure all the declarations needed by the implementation are available to the compiler. In turn, an ".h" file may provide declarations need by multiple ".cpp" files, and therefore the file may be referenced from several ".cpp" files.

C++ language features are largely composed on other language features. At the bottom of this hierarchy are primitive elements such as symbols (e.g., names), literals (e.g., values), keywords, operators, and delimiters. Moving up the containment hierarchy are composites such as variables, methods, structures, and namespaces. At the top of the containment hierarchy, the C++ elements are contained in the source files previously described. Some C++ constructs have distinct declarations and implementations. In other constructs, the declaration and implementation are one and the same. Thus, the code generated for any language feature is the composite of the code generated by all component language features in the containment hierarchy.

For example, a class may be defined as:

```
class Logger
{
public:
    void Write(char* msg)
    {
        ::printf(msg);
    }
};
```

In this example, the declaration of the class Logger is the composite of the declaration for the instance method Write (char* msg) plus the construct class Logger { ... }. Similarly, the implementation of the class Logger is the composite of the implementations of all the components, i.e., void Logger::Write(char* msg) { ... }.

As previously discussed, the code generator 320 of various embodiments is written in a source code such as C#. Thus, the target language domain model is composed of a hierarchy of C# classes representing the features of the C++ language. At the root of this hierarchy is the abstraction element (e.g., CodeElement). This abstraction encapsulates the fundamental behavior of separating declaration from implementation. For example, in one embodiment, the class CodeElement is defined as:

```
Public abstract class CodeElement
{
    public abstract void WriteDeclaration(TextWriter writer);
    public abstract void WriteImplementation(TextWriter writer);
}
```

In turn, all language elements of the C++ language are represented as derivations of the CodeElement class. Each derived C# class must provide an implementation of the methods WriteDeclaration and WriteImplementation that makes semantic sense for the particular feature of the C++ language. For example, the following view of the domain model shown in FIG. 17 illustrates several important C++ language elements and their relationship to CodeElement 1701. In this example, some derivations of CodeElement 1701, such as CppClass 1702, are composites of other CodeElements 1701, such as CppInstanceVariable 1703, CppInstanceMethod 1704, CppClassVariable 1705, and CppClassMethod 1706. Similarly, CppClassMethod 1706 and CppInstanceMethod 1704 are composites of CppMethodParameter 1707. FIG. 18 illustrates some of these compositional relationships provided in the domain model.

Composites implement the behavior of the WriteDeclaration and WriteImplementation methods by delegating to their constituents. For instance, FIG. 19 illustrates an example of how the declaration of a CppClass 1702 is written through the coordinated efforts of CppClass 1702 plus all of its contained methods and variables. Actor 1 1901 (e.g., code generator 620) implements a WriteDeclaration on CppClass 1702. In turn, CppClass 1702 implements a WriteDeclaration on CppInstanceVariable 1703 and CppInstanceMethod 1704, and CppInstanceMethod 1704 implements a WriteDeclaration on CppMethodParameter 1707. Thus, by the composite CppClass 1702 delegating to its constituents, the Actor1 1901 is able to implement the WriteDeclaration for each constituent by simply implementing a WriteDeclaration on CppClass 1702.

The following provides a sample of code implemented by using the target language domain model of various embodiments composed of the hierarchy of C# classes. This particular sample of code illustrates a C++ class called Logger that is composed of one instance variable, _fileStream, and two instance methods, a constructor, and Write. The declaration and implementation are as follows.

Declaration:

```
Class Logger
{
    FileStream& _fileStream;
Public:
    Logger(FileStream& fileStream);
    Void Write(char* message);
};
```

Implementation:

```
Logger::Logger(FileStream& fileStream)
    : _fileStream(fileStream)
{
}
Void Logger::Write(char* message)
{
    _fileStream.Write(message);
}
```

Therefore, in this example, the code generator 320 produces FileStream& _fileStream by implementing the WriteDeclaration method of CppInstanceVariable 1703 of the domain model. The code generator 320 produces the initialization of _fileStream with the argument passed to the constructor, i.e., _fileStream(fileStream), by implementing the WriteImplementation method of CppInstanceVariable 1703 of the domain model. The code generator 320 produces the signature of Write, i.e., void Write(char* message), by implementing the WriteDeclaration method of CppInstanceMethod 1704 of the domain model. Finally, the code generator 320 produces the body of Write, i.e., void Logger::Write (char* message) { _fileStream.Write(message); }, by implementing the WriteImplementation method of CppInstanceMethod 1704.

The C++ language does not specify an internal structuring to C++ source files (e.g., ".h" files and ".cpp" files). As previously mentioned, declarations and implementations can appear anywhere within these files, as long as the rules of the C++ language are preserved. The primary rule that guides the order in which elements are placed in source files is the declaration of a C++ language element must be seen by the compiler before its implementation. Therefore, by convention, declarations appear at the top of the source file and implementations appear after them.

Various embodiments of the domain model provide two additional classes to represent C++ source files. For example, in one embodiment, these classes are CppDeclarationFile and CppImplementationFile. According to various embodiments, each of these classes provides implementations for WriteDeclaration and WriteImplementation, each is composed of other elements in the C++ domain model, and each provides a top-level method (e.g., Write) that orchestrates the contents to file.

FIG. 20 illustrates the containment relationship between CppImplementationFile 2010 and the other elements of the domain model according to various embodiments of the invention. The code generator 320 generates code by composing networks of objects from the domain model and adding each composition to either the declarations collection or implementations collection (or both) of the appropriate file object (e.g., CppImplementationFile or CppDeclarationFile). The code generator 320 then invokes the Write method on the file object. FIG. 21 illustrates this process.

In FIG. 21, Actor2 2101 (e.g., the code generator 320) implements the Write method 2102 on CppImplementationFile 2103. In turn, CppImplementationFile 2103 implements a WriteDeclaration on Declarations 2104 and Declarations 2104 implements a WriteDeclaration on CodeElements 2106. CppImplementationFile 2103 then implements a WriteImplementation on Implementations 2105 and Implementations 2105 implements a WriteImplementation on CodeElements 2106. Thus, the Write method 2102 ensures all the declarations are written to file before the implementations.

Thus, a significant advantage realized in various embodiments that make use of such a C++ domain model is a change to the organization of the source code of the code generator component 320 can be accomplished rapidly due to the compositional nature of the model. This is because such a C++ domain model minimizes the number of source code lines in various embodiments of the code generator 320 that will need to be changed. Such a change may be brought about, for example, to adapt the code generator 320 to new features implemented in the graphical designer 310 or the workflow engine module 400.

For instance, once a C++ class is defined in the domain model, the declaration and implementation of the class can be easily moved among the source files prior to code generation. The following code snippet illustrates:

```
CppClass workflowDirector =
    new CppClass("MyWorkflowDirector");
CppInstanceMethod executeMethod =
    new CppInstanceMethod("Execute", workflowDirector, false);
workflowDirector.AddMethod(
    executeMethod, CppMemberVisibility.Public );
CppDeclarationFile workflowDeclarationFile =
    new CppDeclarationFile(new RelativeFilePath("Program.h"));
CppImplementationFile workflowImplementationFile =
    new CppImplementationFile(new RelativeFilePath("Program.cpp"));
workflowDeclarationFile.AppendDeclaration(workflowDirector);
workflowImplementationFile.AppendImplementation(workflowDirector);
workflowDeclarationFile.Write( );
workflowImplementationFile.Write( );
```

This code snippet will place the declaration for the C++ class MyWorkflowDirector in the file Program.h and the implementation in the file Program.cpp. A developer re-organizing the generated source code such that both the implementation and the declaration of the method Execute appear in Program.h rather than Program.cpp can be accomplished by declaring the method to be "inlined" by changing the following line:

```
CppInstanceMethod executeMethod =
    new CppInstanceMethod("Execute", workflowDirector, false);
```
to
```
CppInstanceMethod executeMethod =
    new CppInstanceMethod("Execute", workflowDirector, true);
```

The developer can accomplish a more substantial re-organization by moving the entire implementation of MyWorkflowDirector from Program.cpp to Program.h by changing the following line:

```
workflowImplementationFile.AppendImplementation(workflowDirector);
```
to
```
workflowDeclarationFile.AppendImplementation(workflowDirector);
```

Compiler Components

In various embodiments of the invention, the compiler components 330 verify that the workflow drawn on the desktop workspace 500 and converted into executable code conforms to the workflow domain model. The compiler components 330 also verify that the executable code conforms to the Petri net domain model the workflow engine module 400 operates on (as is described in more detail below). Thus, the compiler components 330 perform an integrity check on the produced source code files.

State Machine Builder and Flow Chart Builder Components

The state machine builder and flow chart builder components 340, 350 of various embodiments provide a façade that interfaces a particular workflow with the workflow engine module 400 so that the engine 400 can execute the workflow. For instance, in one embodiment, the builders 340, 350 are composed of façade classes that enable morphing a Petri net into a state machine or a flow chart. If a builder 340, 350 is called to execute the source code for a particular workflow and create a process, the builder 340, 350 creates the process by converting the workflow into a Petri net based on a set of classes that represent the components of a Petri Net. For example, the set of classes may be composed of a before Place class, a Transition class, an after Place class, an inward Arc class, an outward Arc class, and optionally a Guard class. Thus, the builder 340, 350 reads in the various objects of the workflow from the source code and converts the object to the appropriate Petri net class that can be invoked by the workflow engine 400. Further details on the workflow engine module 400 and the Petri net classes are provided below.

Workflow Engine Module

As described above, various embodiments of the workflow engine module 400 (workflow engine) are divided into two sets of components (See FIG. 4). The first set of components (runtime components) includes: (1) Petri net microkernel components 410; (2) object pool components 420; (3) tracking components 430; (4) state management components 440; and (5) garbage collection components 450. The second set of components (platform abstraction layer components) includes: (1) delegate components 460; (2) thread pools components 470; (3) communication components 480; (4) instrumentation components 490; (5) concurrency primitives components 491; and (6) serialization components 492. In addition, this module 400 may be stored in RAM memory 67 and executed by the processor 60 in the device 200 shown in FIG. 3 according to various embodiments. Further details of the various components are provided below.

As should be appreciated, the workflow engine 400 and the engine's components may be programmed using any number of source code languages in light of this disclosure. For example, the workflow engine 400 and its corresponding components may be programmed using C++, .Net, C#, and Java, independently or in combination. Though, various embodiments of the workflow engine module 400 make use of C++ source code because such code executes faster than other programming languages such as .Net and Java. This enables the use of the workflow engine 400 in many instances to execute real-time workflows. However, it should be understood that the workflow engine 400 is not limited to being implemented using C++ source code only.

Furthermore, the main engine of the workflow engine module 400 in various embodiments is implemented as a class. For example, in one embodiment, the main engine is implemented as a C++ class CWorkFlowEngine. This class is responsible for obtaining the particular workflow to be executed and for starting the workflow. Thus, the class CWorkFlowEngine contains one or more methods that are called to perform tasks such as retrieving an available workflow from an object pool and waiting for all workflows to execute. The execution of the workflow engine 400 is provided in greater detail below.

Runtime Components
Petri Net Microkernel Components

The Petri net microkernel components 410 according to various embodiments are responsible for sequencing the workflow (e.g., the infrastructure of the workflow) and for managing the execution of the callback methods to implement the application specific level of the workflow. In addition, the Petri net microkernel components 410 of various embodiments are adapted to enable high performance business processes. That is, the Petri net microkernel components 410 are adapted to orchestrate a number of business processes that have an extremely short lifetime (e.g., in the order of milliseconds).

As the name of the components 410 suggests, the Petri net microkernel components 410 are based on a Petri net domain model according to various embodiments. As previously discussed, a Petri net is one of several mathematical modeling languages used to describe discrete distributed systems. A Petri net includes places, transitions, and arcs. Arcs run between places and transitions, but not between places and places or transitions and transitions. In addition, places may contain any number of tokens. In various Petri nets, these token represent information on which transitions will act (e.g., the data that moves the system). Thus, a transition acts on input tokens (e.g., fires) if the transition is enabled, e.g., when there are tokens in every input place for the transaction. If a transition fires, it consumes the tokens from its input places, performs some processing task, and places a specified number of tokens into each of its output places.

In addition, the Petri net microkernel components 410 are also based on a microkernel architectural pattern according to various embodiments. The microkernel philosophy is based on the idea that the workflow engine 410 should contain only the bare minimum needed for ninety-nine percent of the applications and should delegate all of the other work to be done to another layer (and, in many cases, the engine 400 does not need to know how that work is to be done). For example, the workflow engine 400 does not need a persistent state such as a database. Accordingly, all the workflow engine 400 needs to do in various embodiments is sequence the business operations of the workflow and perform a certain amount of concurrency management. As a result, the workflow engine 410 is scaled down and able to execute in resource restrained environments. In addition, the workflow engine 410 of various embodiments at runtime is not dependent upon a particular operating system.

As mentioned, the Petri net microkernel components 410 of various embodiments have adapted the Petri net model into a target language framework. For example, one embodiment of the Petri net microkernel components 410 has adapted the Petri net model into a C++ programming framework. This framework is composed of a set of C++ classes wherein each class represents an element of the Petri net model. In this particular embodiment, the Petri net model used is a single token, non-color Petri net. Therefore, through the entire life cycle of the workflow model, only one token is passed on. In addition, there exits only one main execution path, though the path may have parallel branches.

FIG. 22 illustrates the C++ programming framework (e.g., C++ Petri net domain model) that represents the Petri net model. The framework includes the basic components of the Petri net model such as CToken 2201, CPlace 2202, CArc 2203, and CTransition 2204. The representation of each class is broken up into three sections in FIG. 22. The first section is the name of the class. The second section is the members of the class. For example, the class CTransition 2204 includes the members on ExecuteActivity and _inwardArcs. The third section is the functions and methods of the class. The black diamond illustrates that the class with the diamond contains the class connected to the class with the diamond. For example, the class CPlace 2202 contains the class CToken 2201. Thus, there is a direct one-to-one correspondence between the concepts of the Petri net mathematical model and the C++ classes of the framework.

In general, the class CToken 2201 is linked to class CPlace 2202. The class CPlace 2202 is the passive element of the system (e.g., a state in a state machine). The methods of this class involve determining whether a place has a token inside of it. Thus, these methods allow the workflow engine 400 to delegate to a place to determine whether it has acquired a token or not. If a place (CPlace 2202) acquires a token, the workflow engine 400 triggers the transition (CTransition 2204) (e.g., the work activity) connected to the place to introduce work. Thus, the token (Ctoken 2201) is the data based on a state where the token can reside in and the transition (CTransition 2204) is where work happens on the token (active element of the system). The class CArc 2203 represents the connection between a place and a transition.

Furthermore, the C++ framework includes additional components according to various embodiments. For instance, the class CTrigger 2205 represents triggering a transition based on external stimuli. This is particularly useful in executing state machine applications. The IGuard 2206 represents conditional logic placed on a connection (e.g., CArc 2203). In regard to IGuard 2206, this particular embodiment of the framework includes the classes CBinaryGuard 2207, CGenericGuard 2208, and CNullGuard 2209. The class CBinaryGuard 2207 represents a binary condition (e.g., yes/no condition). The class CGenericGuard 2208 represents a non-binary condition (e.g., multiple conditions). The class CNullGuard 2209 represents a pass through filter. In addition, the framework includes the classes CAndJoin 2210, CAndSplit 2211, COrJoin 2212, and COrSplit 2213. These classes represent high levels of Boolean algebra to be implemented for a workflow. In various embodiments of the workflow engine 400, these classes are used in conjunction with executing concurrency within the workflow.

Object Pool Components

According to various embodiments, the object pool components 420 place loaded workflows into memory so that the workflow engine 400 can pull a workflow from the pool to execute. Thus, once a workflow as been executed, the workflow is not simply discarded but instead is placed in memory. Therefore, if the workflow engine 400 needs to execute the workflow again, the engine 400 simply invokes one or more object pool components 420 to retrieve the workflow from the pool (e.g., call method GetAvailableWorkflowFromObjectPool) so that the workflow engine 400 can execute the workflow. As a result, the workflow engine 400 is able to execute the workflow more quickly because it does not need to wait for the particular workflow to be loaded.

In various embodiments, the object pool components 420 are implemented as one or more classes. For example, in one embodiment, the object pool components 420 are implemented as the class CSimpleObjectPool. This particular class may include such methods to: (1) retrieve an instance of a workflow from the pool (e.g., memory); (2) delete an instance of a workflow from the pool; (3) get an available object from the pool; (4) return an object to the pool; and (5) clear the pool.

Tracking Components

The tracking components 430 of various embodiments track the execution of a workflow by the workflow engine 400. In particular, these components 430 generate data that allows an operator or the engine 400 to track the progress of the workflow as it transitions from one task to another. Thus, the operator or the engine 400 can determine what part of a particular workflow is currently executing at any given time. For example, the operator can use the tracking components 430 to determine that a workflow executing is waiting for an external system to execute a callback method. This may be very helpful in trouble shooting any potential problem experienced when a particular workflow is executed.

The tracking components 430 in various embodiments are composed of one more classes. For instance, in one embodiment, the tracking components are divided into event tracking classes and activity tracing classes as shown in FIG. 23. For example, the event tracking classes may include the classes PerformanceEvent 2301 and BaseEvent 2302. Thus, the workflow engine 400 makes use of the event tracking classes to record certain events occurring and the activity tracing classes to record information that trace certain activities occurring.

State Management Components

The state management components 440 of various embodiments manage the overall state of the workflow. For example, during the execution of a workflow, if an application level call is made, a copy of the workflow's case data is sent to the application. Therefore, the state management components 440 cache the case data prior to the call so that the workflow can recover if the call fails.

Garbage Collection Components

The garbage collection components 450 of various embodiments reclaim resources that have become orphaned. For instance, the workflow engine 400 executes a gateway to communicate with an external resource, however the resource never responds. This can happen for several different reasons such as the resource resides on a system that crashes prior to the workflow engine 400 delegating to the operating system to communicate with the resource. As a result, the resources allocated to manage the gateway (e.g., a thread) become orphaned. After a certain time period, the garbage collection components 450 free up these resources so that they may be used again.

In various embodiments, the garbage collection components 450 are implemented as one or more classes. For instance, in one embodiment, the garbage collection components are implemented as class GarbageCollector with corresponding methods such as RemoveThreadFromMonitor and ActivateSensor.

Platform Abstraction Layer Components

The platform abstraction layer components in various embodiments are what enable the workflow engine 400 to operate across multiple platforms. For instance, for the workflow engine 400 to execute a conditional fork in various embodiments, the engine 400 needs to make use of threads provided by the operating system of the device the engine 400 is running on. Thus, various embodiments of the workflow engine 400 require operating system support to perform tasks such as concurrency, queuing requests, locking data from concurrent access, etc.

In various embodiments, the platform abstraction layer components provide a transition layer from the Petri net language to the operating system language. More specifically, the platform abstraction layer components take on more of the operating system language than the Petri net language. As a result, the core engine (e.g., the runtime components) of the workflow engine 400 remains untouched as the workflow engine 400 is moved from one operating system to another. Thus, the workflow engine 400 of various embodiments is easily adaptable to run on any number of operating systems and on any number of devices.

Delegate Components

As previously discussed, in various embodiments the developer will insert custom code for a particular workflow application into the methods of a callback class representing a particular object (e.g., activity) of the workflow. This custom code represents the work to be performed by the activity. Delegates are a computer science concept in which a piece of code is used as if it where a piece of data. For instance, a function itself is passed as a parameter in another function call.

In various embodiments, the developer does not pass the state machine builder 340 or the flow chart builder components 350 the actual method to execute but passes the builder 340, 350 a pointer (e.g., a reference to the method), and the builder 340, 350 wraps the method pointer into a class that operates as a delegate and passes the delegate to the workflow engine 400. Thus, by using a delegate (e.g., delegate class), the workflow engine 400 is using a first class citizen (e.g., using the delegate without restriction). As a result, the engine 400 does not take raw method pointers from the developer. Instead, the engine 400 takes the delegate and re-delegates it to the operating system so that there is a level of indirection between the raw method pointer created and managed by the developer and what the engine 400 operates on. In turn, the operating system of the device on which the workflow engine 400 is running uses the delegate to access the code of the method to execute the code (e.g., the delegate points back to the application level callback method for the particular activity of the workflow).

However, the workflow engine 400 does not know the pointers, it only knows about the methods. Thus, the workflow engine 400 is solving the higher-order method, which translates in the operating system to calling a method pointer. This pointer is what is making the translation from the Petri net model the workflow engine 400 operates on to the developer's code that the operating system can execute.

For example, the code generator 320 generates code for a callback class to read data from a file.

```
class ReadDataFromFileTransition
{
    void OnExecute (CaseData& caseData, WorkingSet& workingSet)
    {
    }
}
```

The flow chart builder 350 include a method "BuildTransition" then uses this callback class and wraps the class's callback method "OnExecute" in a delegate (e.g., the delegate class CSimpleDelege2).

```
void BuildTransition(...)
{
    ReadDataFromFileTransition transition;
    CSimpleDelegate2< CaseData, WorkingSet > delegate(transition,
        &ReadDataFromFileTransition::OnExecute);
}
```

The workflow engine 400 then invokes this delegate using the overloaded ( ) operator of the CSimpleDelegate2 class.

```
        void Enable( )
        {
            ...
            Delegate ( caseData, workingSet);
        }
```

The delegate components of various embodiments of the workflow engine module 400 include the classes CSimpleDelegate, CSimpleDelegateAsync, CMulticastDelegate, CMulticastDelegateAsync, and CSimpleDelegate2. In certain circumstances, the builder 340, 350 may wrap a pointer that calls multiple pathways at the same time wherein the same dataset is used for all of the pathways. In these circumstances, the CMulticastDelegate and CMulticastDelegateAsync classes are used. These classes contain multiple pieces of operating system code in the same class. Thus, the workflow engine 400 does not need to determine how many pointers in the operating system will be executed once the method is invoked. The delegate class wraps that behind the scenes and calls the multiple pointers in the operating system.

Thread Pools Components

The thread pools components 470 of various embodiments manage the thread pools used to execute concurrency within a workflow. In particular, the thread pools components 470 use or create a background thread to invoke a callback method. Thus, the thread pools components 470 place the method pointer on a thread and the operating system starts execution of the method from the pointer placed on the thread.

In various embodiments, the thread pools components 470 are composed of various classes such as CDefaultlocpBuffer, COverlappedOContext, and ClocpThreadPoolManager. In a particular embodiment, the class ClocpThreadPoolManager includes one or more delegate classes as members and includes various methods to manage the thread pool such as StartThreadPool and AtachHandle.

Communication Components

The communication components 480 of various embodiments enable the workflow to be invoked by a remote client using such services as NamedPipes, TCP/IP, UDP/IP, and middleware products. In various embodiments, the communication components 480 are composed of various classes related to communications channels. For example, an embodiment includes the classes CTcpServer and CTcpClient related to TCP/IP communication.

Instrumentation Components

The instrumentation components 490 of various embodiments provide a logging mechanism, such as an event log. For instance, these components 490 generate detailed diagnostic traces, performance metrics, workflow health data, critical alerts, and plug-in interfaces that hook in custom instrumentation sinks.

Concurrency Primitives Components

The concurrency primitives components 491 of various embodiments are used in conjunction with providing concurrency within a workflow. In particular, these components 491 serve as abstracts of various operating system concurrencies. For example, CSimpleDelegateAsync handles splitting a workflow into two parallel pathways. This class in turn spawns operating system threads, packs up the callback method arguments, and then marshals these arguments to each spawned thread callback. In the case of a conditional split, various embodiments make use of additional classes in conjunction with CSimpleDelegateAsync such as CProtectAccess and CCriticalSection. CProtectAccess abstracts a resource monitor and CCriticalSection abstracts an operating system's critical section so that data associated with the callback methods (e.g., workflow data) is not accessed by more than one thread of execution at a time.

Furthermore, the concurrency primitives components 491 provide the gateway counterparts according to various embodiments. Thus, a piece of data needs to be protected if the piece of data is shared between two threads or two parallel branches are trying to operate on the same piece of data at the same time. In various embodiments, the Petri net microkernel 410 in conjunction with these components acquire a system log before allowing a write so that if the other branch is trying to write, the second write cannot occur until the first write is complete. Therefore, if a piece of data is to be modified that has been split on multiple pathways, only one pathway gets the log to modify the data, though more than one pathway can read the data at the same time.

Serialization Components

The serialization components 492 of various embodiments ensure that binary coupling does not occur if the workflow engine 400 invokes a gateway. In various embodiments, the engine 400 does not pass classes, pointers, or references to the gateway to expose memory structures to the gateway. Instead, the serialization components 492 take the entire workflow data (or a subset of the workflow data) and create a memory stream and pass the memory stream to the gateway. The gateway then receives the memory stream and turns the stream back into a class (e.g., a C++ class). As a result, the class is in the memory inside the gateway and is independent of the workflow.

In various embodiments, the serialization components 492 are composed of several classes and an interface to a gateway. For instance, in one embodiment, the serialization components 492 are composed of the class CXmlToCppSerializer. This class includes methods to serialize a stream of data and to get a serialized stream of data and de-serialize the stream of data. In addition, the class CXmlToCppSerializer communicates with an interface (e.g., ISerializer) to communicate the serialized stream of data to a gateway.

An Example of Providing a Workflow

FIG. 24 provides an example of a workflow developed using the desktop workspace 500 of the graphical designer module 300. This example is provided for illustration purposes only and in no way should be construed to limit the scope of the claimed invention. In the example, the workflow begins with the Start 2401 of the workflow and proceeds to a Decision 2402. The workflow path separates into two paths based on the evaluation of the Decision 2402. If the Decision evaluates to "NO," the workflow proceeds to Process 2403. If the Decision evaluates to "YES," the workflow proceeds to Database Query 2404. Database Query 2404 is considered a gateway in which the workflow engine 400 delegates to the operating system to communicate with an external database and to execute a query on the database.

Once the workflow has either proceeded to Process 2403 or Database Query 2404, the workflow then proceeds to Extract Information 2405. Extract Information 2405 is considered an embedded workflow. Thus, the workflow proceeds to another workflow entitled "extract information." The workflow may pass information to the embedded workflow and the embedded workflow may return information to the workflow depending on the particular implementations of each workflow.

Once the embedded workflow has completed and control has passed back to the primary workflow, the primary workflow proceeds to C Fork 2406. C Fork 2406 represents a split in the path of the workflow into two independent paths. Thus, C Fork 2406 indicates concurrency within the workflow. As previously mentioned, the designer places the C Fork shape 2406 into the workflow during the construction of the workflow on the desktop workspace 500 and this is converted into executable code that indicates to the workflow engine module 400 to perform concurrency within the workflow. In this particular example, the workflow performs two concurrent paths wherein the first path proceeds to Task A 2407 and the second path proceeds to Task B 2408. The two paths converge back at C Merge 2409. C Merge 2409 represents a conditional merge (note that in this example, C Fork 2406 represents a conditional fork). Therefore, the workflow engine module 400 executing the workflow shown in this example does not wait for both Task A 2407 and Task B 2408 to complete before proceeding with the remainder of the workflow. The workflow engine module 400 proceeds with the remainder of the workflow once Task A 2407 or Task B 2408 has completed. Finally, the workflow proceeds to the End 2410 of the workflow as shown in FIG. 24.

As previously discussed, a designer builds the workflow on the desktop workspace 500 by simply dragging and dropping the appropriate shape for each workflow object onto the desktop workspace 500. In addition, the designer indicates on the workspace 500 the connectors between the shapes to represent the flow of the workflow and any conditions related to the connectors. Furthermore, the designer indicates what variables to include into the case data and working set data sets for the workflow, as shown in FIG. 25.

Once the designer has completed designing the workflow on the desktop workspace 500, the designer selects the "code generate" button on the designer screen. The graphical designer module 300 reads the diagram of the workflow and creates an XML representation of the workflow (e.g., workflow domain model). FIG. 26 displays a sample of XML generated when the designer selects the "code generate" button for the example discussed above in FIG. 24. The various objects of the workflow are shown in the element <Elements> 2601 such as "Start," "Decision," and "Database Query." The connectors of the workflow are shown in the element <Connectors> 2602. In addition, the data (e.g., the case data and working set data) is incorporated by reference to the XML schema definition file "SampleFlowChart.xsd" 2603 and the fields for the database query are incorporated by reference to the XML schema definition file "MyGatewayDataContract.xsd" 2604. Furthermore, the conditions placed on the connectors associated with the Decision 2402 of the workflow are shown in the element <Guards>. Thus, the XML found in the file describes the objects of the workflow and how they are wired together.

FIGS. 27, 28, and 29 illustrate the C++ source code generated by the code generator components 320 for the example of the workflow depicted in FIG. 24. Specifically, FIG. 27 illustrates an example of an implementation file containing the workflow assembly source code generated based on a C++ domain model. The file also includes the method "AssembleWorkFlow" 2701 that is executed by the builder 340, 350 to construct the workflow and implement the sequencing of the workflow. Thus, as previously discussed, if the builder 340, 350 executes the method "AssembleWorkFlow" 2701, the builder 340, 350 first builds the individual objects 2702 of the workflow and the connectors between the objects 2703 in memory as an object graph and the workflow engine 400 invokes each of the objects as the engine 400 traverses the graph.

FIG. 28 illustrates an example of a header file declaring callback classes for each object of the workflow depicted in FIG. 24 and the corresponding callback methods for each class. For example, the "DecisionTransition" class 2801 represents the Decision 2402 displayed in the workflow depicted in FIG. 24. This class includes the declaration for two methods, "EvaluateCondition" 2802 and "OnEvaluateCondition" 2803. These two methods are the callback methods for the Decision 2402. In addition, the methods for each class reference the case data (e.g., SampleFlowChartCaseData 2804) and the working set data (e.g., SampleFlowChartWorkingSet 2805) for the workflow.

FIG. 29 illustrates an example of a file containing the implementation for each of the workflow object callback methods. In particular, the workflow engine module 400 delegates to the operating system to call back the methods for a particular workflow object in various embodiments if the engine 400 invokes the object (e.g., class) during execution of the workflow. Therefore, the developer edits this file to write the contents of these methods as needed for the specific application. For example, the developer inserts the code for the method "ProcessTransition::OnExecute" 2901 that is executed for the Process 2403 of the workflow if the engine 400 invokes this Process 2403.

In addition, this file in various embodiments is round-trip engineered as previously discussed. This is to ensure that the code written by the developer is preserved if the workflow is re-complied. Furthermore, the file illustrated in FIG. 29 also depicts the stub implementation as previously discussed. Such an implementation is shown in the method "DecisionTransition::OnEvaluateCondition" 2902. Thus, as previously discussed, the developer replaces this exception with the desired code for the particular object of the workflow.

As previously mentioned, code generator components 320 can generate source code in multiple languages from a single description of the workflow. Thus, FIGS. 30, 31, and 32 illustrate the C# source code (similar to the C++ source code discussed above) generated by the code generator components 320 for the example of the workflow depicted in FIG. 24.

Once the developer has written the application specific code for the workflow, the developer saves the code as an executable program. Thus, to execute the particular workflow, the state machine builder 340 or the flow chart builder 350 reads the workflow assembly source code of the workflow and maps the various objects of the workflow to Petri net classes and builds the workflow in memory. FIG. 33 illustrates the mapping of the workflow depicted in FIG. 24 to the corresponding Petri net classes. For example, the Start 2401, End 2410, Process 2403, Task A 2407, and Task B 2408 map to the transition class CTransition 3301.

As the builder 340, 350 maps the workflow into memory, the builder 340, 350 morphs the objects of the workflow to fit into a Petri net model. For example, the builder 340, 350 first builds a start place for the workflow in memory. This start place serves as the first placeholder for the token to start the workflow (e.g., the first input for the token in the workflow). The builder 340, 350 then builds a start transition (e.g., CTransition) in memory to represent the start 2401 of the workflow shown in FIG. 24 and places an arc between the start place and start transition to connect the two objects.

Next, the builder 340, 350 builds a place in memory for the start transition to output the token into. This place is associated with the decision 2402 shown in the workflow displayed in FIG. 24. Thus, this decision place will serve as the input place to trigger the decision 2402 to execute. The builder 340, 350 then builds a transition in memory to represent the decision 2402. Again, the builder 340, 350 also builds an arc between the decision place and the decision transition.

Next, the builder 340, 350 builds two places into memory leading on different paths from the decision transition along with corresponding arcs between the decision transition and the two places. In this case, the builder 340, 350 also builds into memory a binary guard (e.g., CBinaryGuard) to represent the decision and the direction the workflow will take depending on the returned data (e.g., resulting case data) from the execution of the decision task. In addition, the builder 340, 350 builds the process 2403 and the database query 2404 displayed in FIG. 24 into memory as transitions along with arcs leading from the corresponding places built after the decision transition.

The builder 340, 350 continues to build the workflow shown in FIG. 24 in memory by morphing the corresponding workflow objects indicated in the workflow assembly source code shown in FIG. 27 into a Petri net model according to the mapping shown in FIG. 33.

Once the builder 340, 350 has written the workflow into memory, the workflow engine 400 receives a request to execute the workflow. The execution of the workflow is shown in FIG. 34. Thus, the workflow engine 400 receives the request and begins to execute the workflow, shown as Step 3401. The engine 400 extracts the case data from the token and places the token into the InputPlace (e.g., start place) for the workflow, shown as Step 3402. In this example, the workflow engine 400 then invokes the one or more delegates (e.g., CMultiCastDelegate) in which the corresponding pointers for the transition have been wrapped into by the builder 340, 350, shown as Step 3403. For example, according to one embodiment, the class StartTransition has the callback method OnExecute (see FIGS. 28 and 29). Therefore, the builder 340, 350 wraps the pointer for this method into the appropriate delegate and writes the delegate into memory and the workflow engine 400 invokes this delegate.

Next, the workflow engine 400 activates the start in the workflow, shown as Step 3404. The start of the workflow has been translated into the class CTransition. The engine 400 determines that the transition has been activated (i.e., the engine 400 determines that the token has been placed in the input place for the start transition), and invokes the method on ExecuteActivity, shown as Step 3405. The engine 400 delegates the pointer for the method OnExecute associated with the start of the workflow to the appropriate adapter (e.g., CCustomTransition) and the adapter passes the pointer to the operating system.

The operating system receives the pointer and executes the callback method OnExecute by utilizing the pointer and returns the result to the workflow engine 400. The workflow engine 400 then transfers the token along with the case data to each of the outward arcs for the start transition, shown as Step 3406. Thus, in this example, the workflow engine 400 transfers the token to the outward arc (e.g., CArc) in Step 3407 and the engine 400 then releases the token to the appropriate output place (e.g., OutputPlace) in Step 3408.

This output place serves as the input place for the decision object in the workflow. Thus, the process starts over for the decision transition. In Steps 3403 and 3404, the workflow engine 400 invokes the appropriate delegate for the callback method for the decision transition and determines whether the decision transition has been enabled. If the engine 400 determines the decision transition has been enabled (e.g., the input place for the decision transition is holding the token), the engine 400 executes the transition, shown as Step 3405. In this case, the corresponding callback method for the decision transition is the method OnEvaluateCondition (See FIG. 29).

Thus, the workflow engine 400 delegates the pointer for the method OnEvaluateCondition to the appropriate adapter and the adapter passes the pointer to the operating system to execute the callback method. For example, the start transition's method OnExecute involves executing logic that produces an output variable based on one or more variables present in the case data. Therefore, the operating system executes the method OnExecute for the start transition and returns in the case data the new output variable. In turn, the operating system executes the method OnEvaluateCondition for the decision transition and determines whether the value of the new output variable produced for the start transition is above a predetermined threshold. If the value is above the predetermined threshold, the operating system creates a determination variable of "YES." If the value is equal to or below the predetermined threshold, the operating system creates a determination variable of "NO." The operating system then returns the case data to the workflow engine 400 with the new determination variable.

The workflow engine 400 then evaluates the returned case data to determine the appropriate outward arcs for the decision transition by invoking the method GuardEvaluatesTo-True, shown as Step 3409. Thus, the workflow engine 400 evaluates the determination variable to determine the appropriate outward arc. If the determination variable indicates "YES," the workflow engine 400 transfers the token to the outward arc leading to the input place for the process transition. If the determination variable indicated "NO," the workflow engine 400 transfers the token to the outward arc leading to the appropriate input place for the database query transition. The workflow engine 400 continues by releasing the token to the input place for either the process transition or the database query transition based on which outward arc the engine 400 had previously placed the token into.

If the workflow engine 400 determines that the appropriate outward arc leads to the input place for the database query transition and, the workflow engine 400 holds the token in the input place for the database query transition, and as a result enables the database query transition to execute, shown as Step 3405. The callback methods associated with the database query transition are OnSetGatewayRequest and OnGetGatewayResponse. In this case, the workflow engine 400 invokes the appropriate delegates for the method pointers for a gateway and delegates the pointers to the adapter to pass to the operating system. As previously discussed, the gateway serves as a connection to an external source. Thus, the operating system uses the appropriate API to communicate with the database and performs the query for the database as specified by the method pointers. As a result, the queried information is returned to the workflow in the case data.

Furthermore, the workflow engine 400 executes the conditional fork representing concurrency within the workflow if the engine 400 encounters this object during execution by invoking the appropriate classes (e.g., CSimpleDelegateAsync, CProtectAccess, and CCriticalSection). Thus, the workflow engine 400 spawns two operating system threads, a first thread used by the operating system to execute the one or more callback methods associated with Task A 2407 and a second thread used by the operating system to execute the one or more callback methods associated with Task B 2408. The workflow engine 400 delegates the pointer for the methods for both Task A 2407 and Task B 2408 to the appropriate adapter and the adapter passes the pointer to the operating system to execute the callback methods. In this case since the concurrency is represented as conditional, once the operating system has completed executing the methods associated with either Task A 2407 or Task B 2408 and has returned the corresponding case data back to the workflow engine 400, the engine 400 continues to execute the workflow by placing the token into the input place for the end of the workflow without waiting for the operating system to complete the execution of the methods for the other task. That is, if the operating system completes the callback methods for Task A 2407 and returns the corresponding case data to the workflow engine 400 before the operating system has completed the callback methods for Task B 2408, the engine 400 continues to execute the workflow without waiting for the operating system to return the case data after executing the callback methods associated with Task B 2408.

Thus, the workflow engine 400 traverses the workflow until the engine 400 has completed executing the workflow. At this point, the engine 400 sends a response (e.g., the end resulting case data) back to the client that issued the request to the engine 400 to execute the workflow.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

The invention claimed is:

1. A computer-readable medium containing code executable by a processor to generate executable source code for a workflow in a particular target language comprising:
   one or more runtime components adapted for:
   reading a file comprising a workflow domain model for a workflow comprising a first set of objects, wherein (a) each object of the workflow domain model represents a particular workflow activity of the workflow or a particular connection between two activities of the workflow and (b) each object of the workflow domain model carries properties associated with the particular workflow activity or the particular connection;
   creating a target language domain model comprising a second set of objects, wherein each object of the second set of objects represents an appropriate object of the target language for each object of the workflow domain model;
   transcribing the properties carried by each object of the workflow domain model to the corresponding object of the target language domain model; and
   generating the executable source code for the workflow in the particular target language from the target language domain model.

2. The computer-readable medium of claim 1 wherein the workflow domain model does not indicate any information about what target language source code is going to be generated.

3. The computer-readable medium of claim 1 wherein the objects of the first set of objects are programming language classes.

4. The computer-readable medium of claim 1 wherein the objects of the second set of objects are programming language classes.

5. The computer-readable medium of claim 1 wherein the file comprising the workflow domain model is an XML schema file.

6. The computer-readable medium of claim 1 wherein the target language comprises one of C++, C#, .NET, or JAVA programming language.

7. The computer-readable medium of claim 1 wherein the source code indicates each activity of the workflow and the connections between the activities.

8. The computer-readable medium of claim 1 wherein the source code includes a set of one or more methods wherein each method is associated with a particular workflow activity and each method serves as a skeleton for a developer to write the content to perform for the particular workflow activity.

9. The computer-readable medium of claim 8 wherein the one or more methods are callback methods.

10. The computer-readable medium of claim 1 wherein the workflow represents a progression of physical work to perform.

11. A system for generating source code for a workflow in a particular target language, the system comprising:
    memory adapted to store a code generator; and a processor in communication with the memory and adapted to execute the code generator stored in the memory, wherein the code generator is adapted for execution by the processor to:
    read a file comprising a workflow domain model for a workflow comprising a first set of objects, wherein (a) each object of the workflow domain model represents a particular workflow activity of the workflow or a particular connection between two activities of the workflow and (b) each object of the workflow domain model carries properties associated with the particular workflow activity or the particular connection create a target language domain model comprising a second set of objects, wherein each object of the second set of objects represents an appropriate object of the target language for each object of the workflow domain model;
    transcribe the properties carried by each object of the workflow domain model to the corresponding object of the target language domain model; and generate the source code for the workflow in the particular target language from the target language domain model.

12. The system of claim 11 wherein the workflow domain model does not indicate any information about what target language source code is going to be generated.

13. The system of claim 11 wherein the objects of the first set of objects are programming language classes.

14. The system of claim 11 wherein the objects of the second set of objects are programming language classes.

15. The system of claim 11 wherein the file comprising the workflow domain model comprises an XML schema file.

16. The system of claim 11 wherein the target language comprises one of C++, C#, .NET, or JAVA programming language.

17. The system of claim 11 wherein the source code indicates each activity of the workflow and the connections between the activities.

18. The system of claim 11 wherein the source code includes a set of one or more methods wherein each method is associated with a particular workflow activity and each method serves as a skeleton for a developer to write the content to perform for the particular workflow activity.

19. The system of claim 18 wherein the one or more methods are callback methods.

20. The system of claim 11 wherein the workflow represents a progression of physical work to perform.

21. A computer-implemented method for generating source code for a workflow in a particular target language, the method comprising the steps of:
    reading via a code generator residing on a computer device a file comprising a workflow domain model for a workflow comprising a first set of objects, wherein (a) each object of the workflow domain model represents a particular workflow activity of the workflow or a particular connection between two activities of the workflow and (b) each object of the workflow domain model carries properties associated with the particular workflow activity or the particular connection;
    creating in memory a target language domain model comprising a second set of objects, wherein each object of the second set of objects represents an appropriate object of the target language for each object of the workflow domain model;
    transcribing the properties carried by each object of the workflow domain model to the corresponding object of the target language domain model; and
    generating the source code via the code generator for the workflow in the particular target language from the target language domain model.

22. The method of claim 21 wherein the workflow domain model does not indicate any information about what target language source code is going to be generated.

23. The method of claim 21 wherein the objects of the first set of objects are programming language classes.

24. The method of claim 21 wherein the objects of the second set of object are programming language classes.

25. The method of claim 21 wherein the file comprising the workflow domain model comprises an XML schema file.

26. The method of claim 21 wherein the target language comprises one of C++, C#, .NET, or JAVA programming language.

27. The method of claim 21 wherein the source code indicates each activity of the workflow and the connections between the activities.

28. The method of claim 21 wherein the source code includes a set of one or more methods wherein each method is associated with a particular workflow activity and each method serves as a skeleton for a developer to write the content to perform for the particular workflow activity.

29. The method of claim 28 wherein the one or more methods are callback methods.

30. The method of claim 21 wherein the workflow represents a progression of physical work to perform.

* * * * *

UNITED STATES PATENT AND TRADEMARK OFFICE
CERTIFICATE OF CORRECTION

PATENT NO.        : 8,332,811 B2                                        Page 1 of 1
APPLICATION NO.   : 12/433533
DATED             : December 11, 2012
INVENTOR(S)       : Festa It is certified that error appears in the above-identified patent and that said Letters Patent is hereby corrected as shown below:

In the Claims:

Column 38

Line 34, "object" should read --objects--

Signed and Sealed this
Seventh Day of May, 2013

Teresa Stanek Rea
*Acting Director of the United States Patent and Trademark Office*